US009959424B2

(12) United States Patent
Bilotta

(10) Patent No.: US 9,959,424 B2
(45) Date of Patent: May 1, 2018

(54) INFORMATION BASED LIFE VIEW

(71) Applicant: Michael Bilotta, Portola Hills, CA (US)

(72) Inventor: Michael Bilotta, Portola Hills, CA (US)

(*) Notice: Subject to any disclaimer, the term of this patent is extended or adjusted under 35 U.S.C. 154(b) by 491 days.

(21) Appl. No.: 14/205,644

(22) Filed: Mar. 12, 2014

(65) Prior Publication Data

US 2015/0261386 A1 Sep. 17, 2015

(51) Int. Cl.
*G06F 17/30* (2006.01)
*G06F 21/62* (2013.01)

(52) U.S. Cl.
CPC .... *G06F 21/6245* (2013.01); *G06F 17/30867* (2013.01)

(58) Field of Classification Search
CPC ... H04L 43/08; H04L 47/6275; H04L 51/046; G06F 17/30864; G06F 3/1206; G06F 3/0481; G06F 17/30528; G06F 21/6245; G06F 17/30867; G06K 2009/00738; G06K 9/2081

See application file for complete search history.

(56) References Cited

U.S. PATENT DOCUMENTS

| 5,848,396 A * | 12/1998 | Gerace | G06Q 30/02 705/14.49 |
| 5,884,282 A * | 3/1999 | Robinson | G06F 17/30699 705/12 |
| 6,317,783 B1 * | 11/2001 | Freishtat | G06F 17/30867 707/999.01 |
| 8,015,117 B1 * | 9/2011 | Lillibridge | G06Q 20/382 705/64 |
| 2002/0109882 A1 * | 8/2002 | Araki | H04L 49/30 398/101 |
| 2004/0044677 A1 * | 3/2004 | Huper-Graff | G06Q 30/02 |
| 2005/0192008 A1 * | 9/2005 | Desai | G06F 21/335 455/435.2 |
| 2008/0010128 A1 * | 1/2008 | Allen | G06Q 30/02 705/14.67 |

(Continued)

OTHER PUBLICATIONS

Hariton A. Efstathiades, Extract Knowlege from Social Networks, Dec. 30, 2013.*

*Primary Examiner* — Tadeese Hailu
(74) *Attorney, Agent, or Firm* — Rutan & Tucker LLP; Hani Z. Sayed

(57) ABSTRACT

A method for enabling a user to customize, prioritize, and view information filtered to align with the user's life state that includes interaction with an online market place. The user provides priority, positioning, and custom information about the user's life state which allows the user to view information in a life view. This information may include at least demographic information, logistical information, ethnic information, social information and psychological information. The partners may use the information about the user's life to filter its information according to the information about the user's life, which is then viewed in a life view by a user, according to the user defined positioning, prioritization, and other custom parameters. The method also enables the user to view partner and user participation in a marketplace to procure the information about the user's life, user ratings according to the user's behavior, and partner ratings according to the partner's information delivery.

10 Claims, 16 Drawing Sheets

(56) References Cited

U.S. PATENT DOCUMENTS

| | | | | |
|---|---|---|---|---|
| 2008/0209343 A1* | 8/2008 | MacAdaan | ............ | G06F 3/0482 715/747 |
| 2008/0288355 A1* | 11/2008 | Rosen | ................. | G06F 17/3087 705/14.64 |
| 2009/0031301 A1* | 1/2009 | D'Angelo | ............... | G06Q 10/10 717/178 |
| 2010/0030734 A1* | 2/2010 | Chunilal | ........... | G06F 17/30867 707/770 |
| 2011/0145057 A1* | 6/2011 | Jones | ..................... | G06Q 30/02 705/14.42 |
| 2011/0208589 A1* | 8/2011 | Garg | ..................... | G06F 3/0482 705/14.58 |
| 2011/0225293 A1* | 9/2011 | Rathod | ............. | G06F 17/30867 709/224 |
| 2011/0258049 A1* | 10/2011 | Ramer | ................. | G06F 17/30867 705/14.66 |
| 2012/0109882 A1* | 5/2012 | Bouse | .................. | H04L 67/306 707/607 |
| 2013/0290339 A1* | 10/2013 | LuVogt | ............. | G06F 17/30867 707/740 |

* cited by examiner

INFORMATION BASED LIFE VIEW

FIELD OF THE INVENTION

Embodiments of the present invention generally relate to the field of user displayed data and the layout of the data by the use of and in some embodiments, specifically relate to a custom configured portal zones, used in conjunction with an information delivery system.

BACKGROUND

Users today rely heavily on the Internet to manage information. Popular information portals such as Microsoft's MSN® network and Google®'s iGoogle compete against one another to deliver more customized information to the Users. Facebook®, MySpace, and LinkedIn® are also examples of information portal variants, and these portals focus on information management under the context of relationships. Web portals may be available to the Users as part of a search engine (e.g., Microsoft® Bing, Google®, Yahoo®) or simply as an information management interface (e.g., iGoogle). Generally, the portal may rely on the definition of user preferences, which are used by underlying search engines or partnerships with information providing organizations to display information for the user. The information may be rearranged on the portal, somewhat custom filtered, and also coupled with search engine functionality. Accurate information is important to the users and correspondingly the advertisers and/or content providers. The accuracy and utility of the information may be based on the filters and preferences selected by the Users and how effective the portal queries and displays the information. When a portal is perceived by a user as accurate and useful, the user is more likely to continue using the same portal for the user's more static informational needs. These methods of displaying information (portals) may be acceptable to the Users for general and high level information needs. However, these portals fall short in providing a true depiction of a user's life view, and these portals do not demonstrate a deep relationship between the user, organizations, and information delivered by the organizations.

SUMMARY OF THE INVENTION

For some embodiments, a method to enable a user to manage an information life view that is based on filtered information that dynamically structures and displays the information about the user's life according to the information that is most relevant to the user at any given point in time. The life view managing information regarding the user's life view may be referred to as the user's life view. The user's life view may include many categorical information zones related to the user's life view, based on filters in at least areas such as demographic, ethnic, social and psychological aspects. The user may define the filters, as part of the SpotMi Life view. The user may also define which categorical areas display, how the information changes, and criteria that determines how the categorical zones dynamically change. The user may specify the categories, layouts, and information to change according to the user's life view, which is based on the underlying SpotMi Information Delivery System. The information category layouts and content are prioritized at least based on user settings that determine preference, alignment scores derived from the underlying SpotMi Information Delivery System, and other life view parameters (for example, the user can configure future events and important dates to dynamically trigger layout changes to display content relevant to these dates and events as they approach the current date). The user may also define time-phased rotation of information categories, which can be based at least on month, season, events, years, career states, geography. This embodiment may interface with the underlying SpotMi Information Delivery System to allow users to rate the alignment for the information delivered to the life view. The life view information is presented to, and modified by, the user via the user's life view settings or some embodiments may also include various devices, appliances, and systems. A marketplace may integrate with the portal to allow suppliers of information to push specific information to the user's portal, through the underlying SpotMi Information Delivery System and the SpotMi Information Marketplace.

To this end, in an exemplary embodiment, a computer-implemented method, comprising: receiving, prioritizing, positioning, and displaying information about and relevant to a user's life from a user who is a registered member of an information delivery system, wherein the information about and relevant to the user's life includes at least (a) demographic information, (b) ethnic information, (c) social information, and (d) psychological information; enabling the user to grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner, in order for the partner to display customized information relevant to the user's life view; and receiving the filtered information from the partner, wherein the filtered information is generated by the partner based on applying the information about and relevant to the user's life to information of the partner, wherein the information about and relevant to the user's life is provided by the user using a client computing system associated with the information delivery system, wherein the information about and relevant to the user's life is received by a server computing system associated with the information delivery system, and wherein the information about the user's life is received, prioritized, positioned, and displayed according to the user's life.

In another exemplary embodiment, comprising: providing a life view to enable the user to view the filtered information, wherein the filtered information may be a subset of the information of the partner, and wherein the life view associated with the user is independently configurable from a life view associated with another user of the information delivery system.

In another exemplary embodiment, comprising: providing and displaying information from a marketplace to enable partners to procure the information about the user's life. Wherein the user may prioritize, position, and display information regarding marketplace interests, bids, offers, and transactions.

In another exemplary embodiment, comprising: establishing a data structure to enable the user to provide the information about and relevant to the user's life, the data structure including fields related to one another, wherein each of the fields is associated with a value, and wherein the data structure includes multiple levels such that a field at a lower level is to provide more detail information and value than a corresponding field at a higher level. Wherein information may be displayed, prioritized, and positioned in a life view from multiple levels according to the user's life.

In another exemplary embodiment, comprising: automatically populating the fields of the data structure with a set of baseline values; and enabling the user to update the baseline values and non-baseline values to accurately reflect the user's life. Wherein baseline information may be displayed, prioritized, and positioned in a life view from multiple levels according to the user's life.

In another exemplary embodiment, comprising: enabling the user to update the baseline values and the non-baseline values using a mobile computing system and a mobile application associated with the information delivery system. Wherein information may be displayed, prioritized, and positioned in a life view on a computing system, mobile application, and by other embodiments herein.

In another exemplary embodiment, comprising: enabling the user to rate the partner based on whether the filtered information from the partner is aligned with the information about and relevant to the user's life; and enabling the partner to rate the user based on whether the information about and relevant to the user's life is aligned with behavior of the user when the user visits a website associated with the partner. Wherein the user rating for the partner may be used as a setting in the user's prioritization, positioning, and displaying of that partner's information in a life view. Wherein the partner rating for the user may be visible in the user's prioritization, positioning, and displaying of that partner's information in a life view.

In another exemplary embodiment, comprising: storing the information about and relevant to the user's life and life view in a secured relational database associated with the information delivery system; and enabling the information about and relevant to the user's life to be accessed by the partner when the user visits a website of the partner; and enabling the information about and relevant to the user's life to be customized and accessed by the user through the user's life view.

In another exemplary embodiment, wherein customized web pages are presented to the user when the user visits the website of the partner, and wherein the customized web pages are generated by the partner based on the information about and relevant to the user's life. Wherein the user may access these customized web pages from a life view.

In another exemplary embodiment, wherein filtered search results are presented to the user when the user visits the website of the partner, and wherein the filtered search results are generated by the partner based on search parameters provided by the user and based on the information about and relevant to the user's life. Wherein the search parameters and search results generated by the partner may be factored into the information pushed by the partner into a life view.

Still another exemplary embodiment, a computer-readable media that stores instructions, which when executed by a machine, cause the machine to perform operations comprising: receiving information about a user's life from a user who is a registered member of an information delivery system, wherein the information about the user's life includes at least demographic, ethnic, social and psychological information; enabling the user to set parameters to control (a) access to the information about the user's life by a partner and (b) volume and frequency of filtered information to be received from the partner on behalf of the user, wherein the partner is also a registered member of the information delivery system; receiving the filtered information from the partner, wherein the filtered information is generated by applying the parameters to information of the partner; and prioritizing, positioning, and presenting the filtered information to a user life view.

In another exemplary embodiment, wherein the user further sets the parameters to control (a) frequency of receiving the filtered information from the partner, and (b) priority, order, and customized filtering of information to be delivered to a user life view based on the user's life and display preferences.

In another exemplary embodiment, comprising: establishing a data structure to enable the user to provide the information about the user's life, the data structure including fields related to one another, wherein each of the fields is associated with a value representing one aspect of the user's life; automatically populating the fields of the data structure with a set of baseline values; enabling the user to manually update the baseline values or non-baseline values to more accurately reflect the user's life; enabling the user to rate the partner based on whether the filtered information pushed by the partner is aligned with the information about the user's life; and enabling the partner to rate the user based on whether the information about the user's life is aligned with behavior of the user when the user visits a website associated with the partner; and presenting the baseline values or updated values, and the partner and user ratings, in a user life view, according to the user's prioritization, positioning, and custom display settings.

In another exemplary embodiment, comprising: providing a marketplace for the partner or other users to purchase the information about the user's life; and enabling the partner to use the information about the user's life to customize web pages of the partner when the user visits a web site of the partner; and enabling marketplace information to be displayed in a user life view, according to priority, positioning, and custom display settings; and enabling a user to interact with and use marketplace information in the user's life view.

In another exemplary embodiment, wherein the marketplace is an auction-based marketplace, wherein the customized web pages include web pages that present filtered search results when the web site is associated with a search engine, and wherein the customized life view include filtered, prioritized, custom positioned information, and custom settings associated with a life state, market place, and life view.

In another exemplary embodiment, comprising: enabling the user to cause the values of the fields of the data structure to be updated using a mobile application associated with the information delivery system; and wherein the user may access, interact with, and modify settings for a life view according to the embodiments herein.

In another exemplary embodiment, wherein the mobile application is configured to enable the user to provide user experience and to cause one or more values of the fields of the data structure to be updated according to the user experience; and wherein the updated information and user experience may be accessed, updated, and interacted with in a user's life view.

Still in another exemplary embodiment, a system, comprising: an information delivery server connected to a network, the information delivery server configured to: (a) enable a user to provide information about a user's life using a client computing system coupled with the information delivery server, wherein the information about the user's life includes at least demographic, ethnic, social and psychological information, and wherein the information about the user's life is stored in a database coupled with the information delivery server, the client computing system connected to the network; (b) enable the user to set parameters that control access to the information about the user's life by a partner and volume and frequency of information to be received from the partner on behalf of the user, wherein the information received from the partner is to be aligned with the information about the user's life, and wherein the partner is associated with a partner server connected to the network; (c) enable the partner to rate the user based on whether behavior of the user when the user visits a web site of the partner is aligned with the information about the user's life; (d) enable the user to rate the partner based on whether the information received from the partner is aligned with the information about the user's life; and (e) enable the user to access, update, and interact with a user life view, which contains custom information, customized according to the embodiments herein, wherein the custom information may be further customized by prioritizing, positioning, and other user defined custom settings that change how the information is displayed to a user in a user life view.

In another exemplary embodiment, wherein the information delivery server is further configured to (a) provide a marketplace to enable the partner to purchase the information about the user's life and (b) provide a life view to present the information received from the partner to the user according to priorities, positioning settings, and other user defined settings.

In another exemplary embodiment, wherein the user and the partner are registered with the information delivery server, and wherein the information delivery server is further configured to (a) receive updated information about the user's life from the user via a mobile computing device, and (b) enable the partner to access the information about the user's life to customize the website of the partner according to the information about the user's life; and (c) enable the user to access, update, and interact with a user life view via a mobile computing device.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

DETAILED DESCRIPTION

Figure 1:
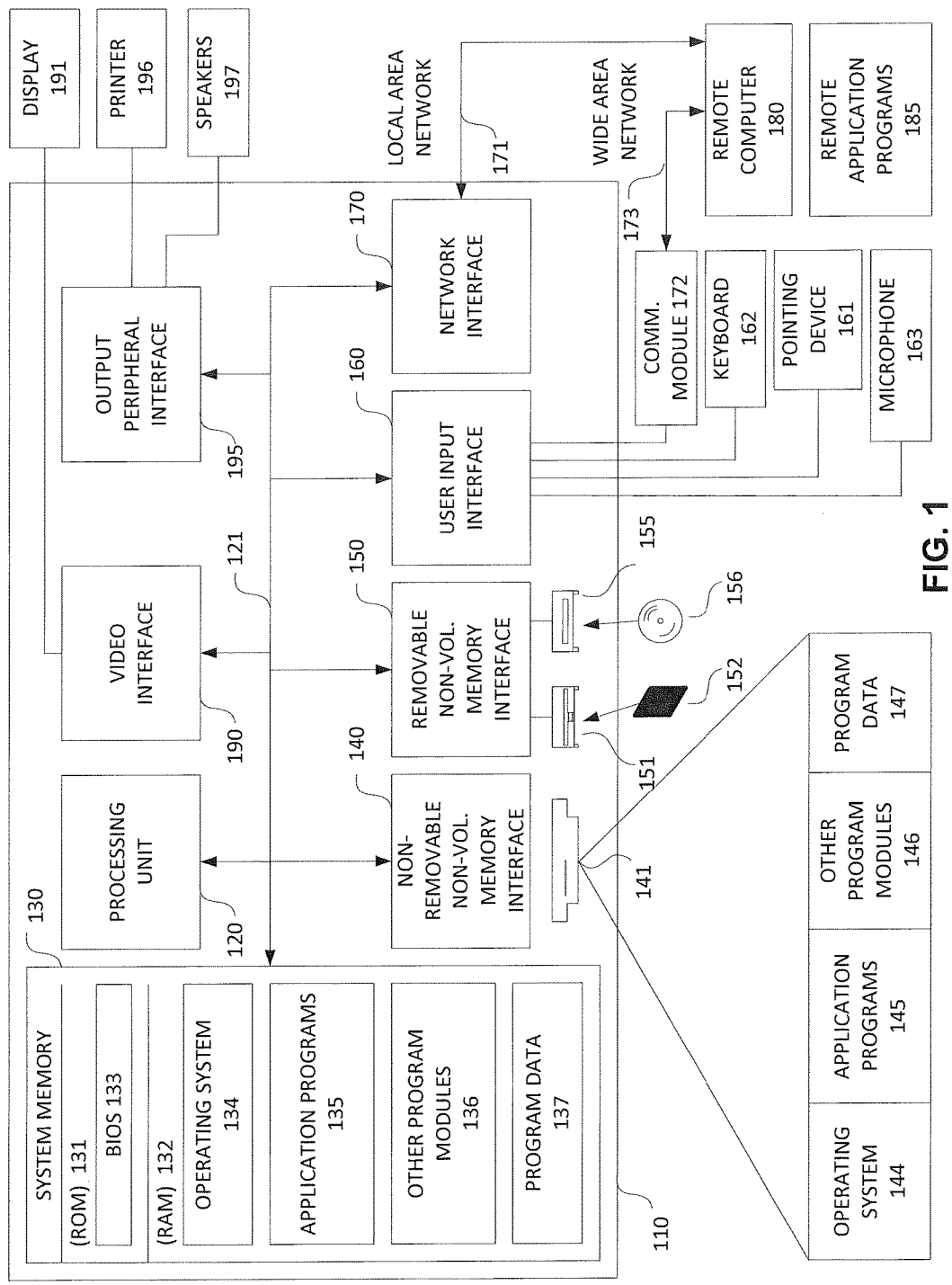
FIG. 1 illustrates one example of a computing device that may be used, in accordance with some embodiments.

For some embodiments, a method for displaying delivered information is disclosed. The method comprises enabling a user to register and become a member of a life view based on custom delivered information. Information is displayed based on parameters the user provides about the user's life which is also known as a life state. The user's life state may span many areas including at least demographic information, ethnic information, social information, behavioral information, and psychological information. The user may grant third parties permission to deliver information to the user's life state. The third parties are also members of the information delivery system, which in turn are allowed to deliver information to the user's life view. The third parties may use the user's life state to filter information for the user.

In the following description, numerous specific details are set forth, such as examples of specific data signals, components, connections, displays, configurations, etc. in order to provide a thorough understanding of the present invention. It will be apparent, however, to one skilled in the art that the present invention may be practiced without these specific details. In other instances, well known components or methods have not been described in detail but rather in block diagrams in order to avoid unnecessarily obscuring the present invention. Thus, the specific details set forth are merely exemplary. The specific details may be varied from and still be contemplated to be within the spirit and scope of the present invention.

The present invention also relates to apparatus for performing the operations herein. This apparatus may be specifically constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium.

The algorithms and displays presented herein are not inherently related to any particular computer or other apparatus. Various general purpose systems may be used with programs in accordance with the teachings herein, or it may prove convenient to construct more specialized apparatus to perform the required method blocks. The required structure for a variety of these systems will appear from the description below.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

Computer System

FIG. 1 illustrates a block diagram of an example computing system that may use an embodiment of one or more of the software applications discussed herein, in accordance with some example embodiments. The computing system environment 100 is only one example of a suitable computing environment, such as a client device, and is not intended to suggest any limitation as to the scope of use or functionality of the design. Neither should the computing environment 100 be interpreted as having any dependency or requirement relating to any one or combination of components illustrated in the exemplary operating environment 100. Embodiments of the invention may be implemented on any type of computer, device, apparatus, or even machine that make use of the computer environment 100. For example, the device may be a medical device that displays the user's medical history or current conditions.

The design is operational with numerous other general purpose or special purpose computing system environments or configurations. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, automotive and informational appliances, and the like.

The design may be described in the general context of computing device executable instructions, such as program modules, being executed by a computer. Generally, the program modules include routines, programs, objects, components, data structures, etc., that perform particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing type system for implementing the design includes a general-purpose computing device in the form of a computing device 110. Components of computing device 110 may include, but are not limited to, a processing unit 120 having one or more processing cores, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing device 110 typically includes a variety of computing machine readable media. Computing machine readable media can be any available media that can be accessed by computing device 110 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but they may be connected by other interface and bus structures, such as a parallel port, game port or a universal serial bus (USB). A monitor or display 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing device 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing device 110. The logical connections depicted in FIG. 1 include a local area network (LAN) 171 and a wide area network (WAN) 173, but may also include other networks. Such networking environments are commonplace in offices, enterprise-wide computer networks, intranets, extranets, and the Internet. A browser application may be resident on the computing device and stored in the memory.

When used in a LAN networking environment, the computing device 110 is connected to the LAN 171 through a network interface or adapter 170. When used in a WAN networking environment, the computing device 110 typically includes a communication module 172 or other means for establishing communications over the WAN 173, such as the Internet. The communication module 172 may be a modem used for wired, wireless communication or both. The communication module 172 may be internal or external, may be connected to the system bus 121 via the user-input interface 160, or other appropriate mechanism. In a networked environment, program modules depicted relative to the computing device 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present design can be carried out on a computing system such as that described with respect to FIG. 1. However, the present design can be carried out on a server, a computer devoted to message handling, or on a distributed system in which different portions of the present design are carried out on different parts of the distributed computing system.

Another device that may be coupled to bus 111 is a power supply such as a battery and Alternating Current adapter circuit. As discussed above, the DC power supply may be a battery, a fuel cell, or similar DC power source that needs to be recharged on a periodic basis. For wireless communication, the communication module 172 may employ a Wireless Application Protocol to establish a wireless communication channel. The communication module 172 may implement a wireless networking standard such as Institute of Electrical and Electronics Engineers (IEEE) 802.11 standard, IEEE std. 802.11-1999, published by IEEE in 1999. Other wireless communication methods that may also be used may include Bluetooth, Radio Frequency, etc.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

It is possible for some embodiments of the invention to have a computing environment 100 that entails memory and display functions without a processing function. For example, a third party may provide customized information to a user, which is relayed to a device for display only with no data manipulation necessary.

Network Environment

Figure 2A:
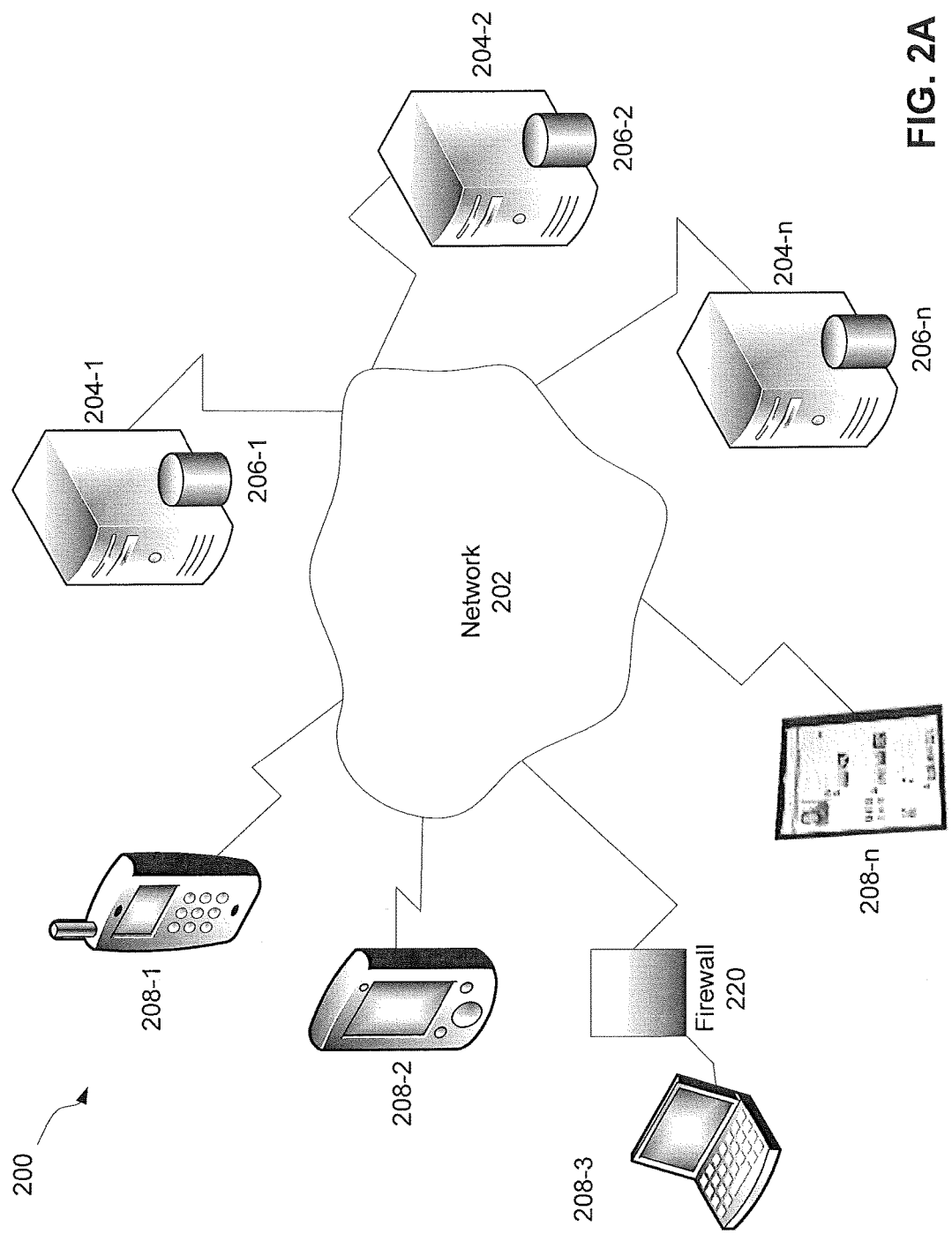
FIG. 2A illustrates an example of a network that may be used to pull filtered information, in accordance with some embodiments.

FIG. 2A illustrates a network environment 200 in which the techniques described may be applied, in accordance with some example embodiments. The network environment 200 has a network 202 that connects server computing systems 204-1 through 204-n, and at least one or more client computing systems 208-1. As shown, there may be many server computing systems 204-1 through 204-n and many client computing systems 208-1 through 208-n connected to each other via a network 202, which may be, for example, the Internet. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 208-1 and the server computing system 204-1 can both initiate and respond to communications, their communication may be viewed as peer-to-peer. Likewise, communications between the client computing systems 204-1, 204-2 and the server computing systems 208-1, 208-2 may be viewed as peer-to-peer if each such communicating device is capable of initiation and response to communication. One or more of the server computing systems 204-1 to 204-n may be associated with a database such as, for example, the databases 206-1 to 206-n. A firewall such as, for example, the firewall 220 between a client computing system 208-3 and the network 202, may be used to protect data integrity. Another firewall example is the firewall 221 positioned between the server 204-2 and the network 202. Although not shown, other devices (e.g., proxy servers, etc.) may also be connected to the network 202.

FIG. 2A also illustrates a block diagram of an embodiment of a server computing system to display information, such as a web page, etc. A user via a browser from the client computing system 208-1 may interact with the web page, and then supply input to the query/fields and/or service presented by a user interface of the application. The web page may be served by a web server computing system 204-1 on any Hypertext Markup Language (HTML) or Wireless Access Protocol (WAP) enabled client computing system 208-1 or any equivalent thereof. For example, the client mobile computing system 208-1 may be a smart phone, a touch pad, a laptop, a netbook, etc. The client computing system 208-1 may host a browser to interact with the server computing system 204-1. Each application, widget, plug-in, etc. has a code scripted to perform the functions that the software component is coded to carry out such as presenting fields and icons to take details of desired information. The life view applications may be hosted on the server computing system 204-1 and served to the browser of the client computing system 208-1. The applications then serve pages that allow entry of details and further pages that allow entry of more details.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, SQL, Java, or other variants of such or similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be noted that the configuration of the diagram illustrated in FIG. 2 is for illustrative purposes only, and the actual configurations may vary. There might be different configurations of servers, firewalls, clients, and devices. For example, the devices may be anything from iPads, to Autos, to TV devices, and so on.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Overview

As the Internet continues to evolve into a more intelligent network of information, there remains a significant gap between what the users want and what or how the information is delivered and viewed by the users. Information is viewed by various portals or customized views. Current portals and custom views have many limitations that embodiments of the present invention address. Following are some of the factors regarding the limitations of the current search techniques: (a) Users may not accurately understand when they should submit a query or that their situation requires a query; (b) It is almost impossible to use accurate search terms or keywords in a way that will yield exactly what the Users are looking for; (c) Even if the accurate search terms are provided, changes in the User's Life State or the information environment may cause what is considered accurate during one time period to become inaccurate during another time period; (d) Because of a User's privacy rights, the information delivered to a portal or customized view will always be inadequate by failing to accurately take into consideration factors hidden or limited by the privacy rights; (e) Because of privacy rights, the information provided on portals or custom views will be invasive to a User's privacy rights, as the current method of managing privacy rights is flawed; f) There are no user feedback mechanisms to bilaterally advise the portal or custom view information providers of their accuracy, allowing the providers to more effectively tailor their results for each User; (g) Since the number of organizations and indexed information is theoretically infinite, there are insufficient mechanisms that causes the providers of portal or custom view information to use a method of continuous improvement and focus to yield fewer more relevant query results. Instead, there is the appearance of some relevant information that has varying degrees of accuracy; (h) There are insufficient methods or instruments that allow information in a portal or custom view to change, update, or morph according to the User's informational requirements (driven by the User's situation, query criteria, or changes that modify the relevance of the query); (i) There are insufficient methods or instruments that allow the structure, sequencing, and order of the components and sections of the portal or custom view to change, reorder, or rehash what or how the information is displayed, according to the User's information requirements (driven by the User's situation, query criteria, or changes that modify the relevance of the query); (j) There are no feedback mechanisms that convey to the User the relevance and accuracy of the information delivered, as compared to the User's Life State and situation, which is displayed in the portal or custom view.

Embodiments of the invention fully utilize the information about a user's life to enable delivering of filtered and customized information, through dynamically changing areas within the life view, according to the changes in the user's life, to the users. The information about the user's life is also referred to as a life state, while how the information is used, displayed, ordered, and filtered is referred to as the life view. The life state may consist of many categories, which are dynamically used and updated by the life view. A user may grant third parties access to the user's life state by setting security features and gatekeeping features. As will be described, embodiments of the present invention may include an information delivery system that delivers filtered information to the users. The information delivery system enables third parties to have access to the users' life states, as allowed in transactions between the users and the third parties. Each user is associated with a unique life state. The life state is used as filters or as a basis for customized services (e.g., web sites, emails, etc.). Embodiments of the invention also include an architecture that includes a centralized server computer system connected to the Internet and configured to deliver information to the users. The centralized server computer system is referred to herein as an information delivery server. The information delivery server may be configured to provide the users a life state interface to enable the users to provide the values for the attributes and sub-attributes associated with their life states. The information delivery server is coupled with a database configured to store the values for the attributes and the sub-attributes. The information delivery server is configured to provide the users an interface to configure their own portals, which are referred to as the users' life view. The users may use their life views to view the filtered information. The information delivery server may also be configured to enable the users and the third parties to rate one another. Replication may be involved to make access, delivery and update operations by the information delivery server more efficient.

Life State

Figure 3A:
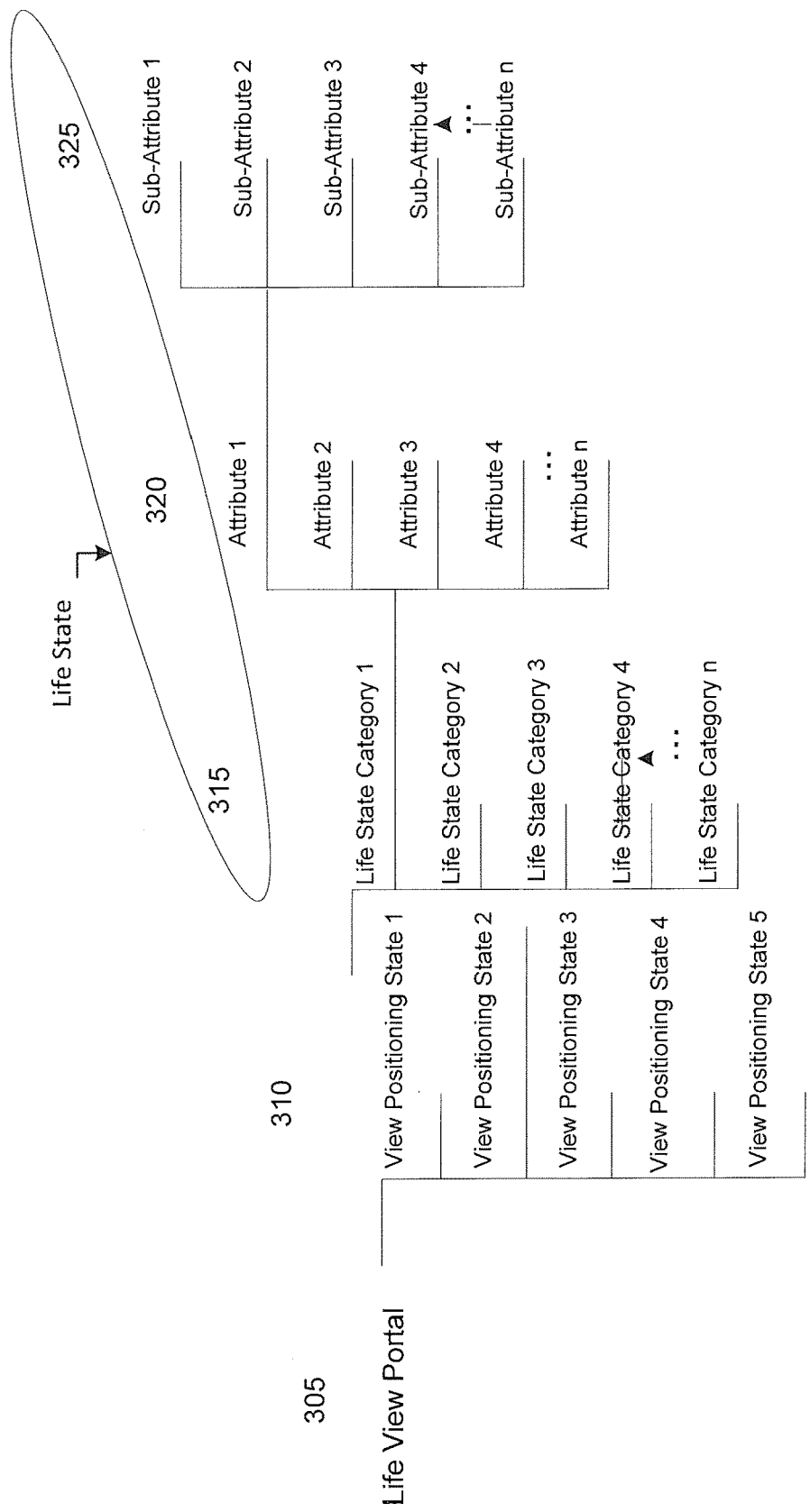
FIG. 3A illustrates an example structure of the life view, in accordance with some embodiments.

FIG. 3A illustrates an example structure of a life view, in accordance with some embodiments. A life view may display many category sections, custom category sections, or dynamic category sections. Each category section may consist of many attributes. Each attribute may consist of many sub-attributes. Together, the category sections, the attributes, and the sub-attributes may conceptually display information about the user from many different views. The category sections, attributes and sub-attributes may be related to one another in a top-down relationship and/or laterally—enhancing the interpretations of each attribute value. The category sections, the attributes, and the sub-attributes may be displayed as defined by the user's criteria, Life State, and the information delivered. In some embodiments, they may also vary based on standards and changes by industry authorities, since industry authorities play a major role in delivering information to a user's Life State.

Referring to FIG. 3A, the life view may consist of view positioning states 310. Although not illustrated, a view positioning state may consist of many deeper levels of positioning states. For example, under the positioning state 1, there be view positioning state 1.1, view positioning state 1.2, view positioning state 1.1.2, etc. A life view derives multiple categories, attributes, and subattributes from a life state. A life state may consist of multiple categories 315. It is envisaged that each of the many aspects of a user's life can be mapped to a category of the life state, which may be used by a view positioning state. Each of the categories 315 may consist of many attributes 320 and sub-attributes 325. Although not illustrated, each of the sub-attributes 325 may consist of many deeper levels of sub-attributes. For example, under the sub-attribute 1, there may be sub-attribute 1.1, sub-attribute 1.2, etc. The categories, attributes, and/or sub-attributes may be dynamic and may be displayed by life view, according to the life positioning states. For example, new categories, attributes, and/or sub-attribute values may be added, removed, or moved to another category, attribute, or sub-attribute. The life positioning view definition that is connected to that category, attribute, or sub-attribute will determine how and where the changed, moved, added, or removed values are displayed. The ability to view the updated categories, the attributes and the sub-attributes illustrate the dynamic nature of the life view.

View positioning states may alter how and to what extent the life view displays life state categories, attributes, and sub-attributes. View positioning states may use life state categories, attributes, or sub-attributes. View positioning states may also use information about a user's life view preferences that is mutually exclusive of life state categories, attributes, and sub-attributes. View positioning states may also be used in combination with each other. Following are some possible view positioning states. There may be a view positioning state "Sports-Participation" which may be used to place a higher positioning priority in the user's life view for life state category, attribute, or sub-attribute information relating to sports programs the user is participating in. "Sports-Dependents-Participation" may be used to place higher positioning priority in the user's life view for life state information relating to sports programs that a life state user's dependents are participating in. A view positioning state "Auto-Purchase" may be used to place a higher positioning priority in the user's life view for life state information relating to user specific automobile related information. View positioning states may also be used in combination with each other. For example, there may be view positioning states "Health-Condition" and "Work-Temporary Locations", where the "Health-Condition" view positioning state may prioritize a user's life state category, attribute, or sub-attributes relating to a chronic condition, and the "Work-Temporary Locations" view positioning state may also cause relevant medical facilities to be prioritized that relate to the chronic condition in the "Health-Condition" view positioning state, but may be derived from the user's temporary work location which may be defined in the "Work-Temporary Locations" view positioning state. View positioning states may have dates they are effective or not effective, active or not active, and other criteria that may relate to the view positioning state, a relationship with one or more other view positioning states, or relationships with categories, attributes, or sub-attributes from the user's life state. For some embodiments, the values for the view positioning states, attributes and sub-attributes may be automatically provided. Other example view positioning states, categories, attributes, or sub-attributes are included in the corresponding provisional application which is described in the related application section at the top of this document.

As the user's life changes, the values for the user's life state, categories, attributes, sub-attributes may be updated, which may update the user's life view As the life state, categories, attributes or sub-attributes change, the view positioning states may determine how and if the life state, category, attribute or sub-attribute information is displayed in the user's life view. For example, the view positioning state may determine the categories, attributes, or sub-attributes that may be displayed because of a state of a user's life, which may be determined by information in the user's categories, attributes, or sub-attributes, or by a date or range of dates, by current events, by aging, by affiliations, memberships, hereditary relationships, social relationships, professional relationships, event outcomes, physical states, location, or other life related states. For some embodiments, the categories, attributes and sub-attributes may be automatically positioned. The number combinations of categories, attributes, and sub-attributes (and deeper levels of sub-attributes) may be extensive, and may represent a snap shot of the life of a user, which may require view positioning state filtering. It may be noted that this is different from the traditional portals displayed/used by current systems since the information included in a traditional portal is very limited and only changes based on some discrete user-defined, simple parameters. For example, a traditional portal may display a user's investment holdings for a specific company or exchange, the zip code defined local weather, or a list of local movies currently playing. Following in example, the life view may display all local movie listings all of the time, if the view positioning state is defined in this matter. Continuing to follow on this example, the view positioning state may be enhanced to only display the movie listings on certain days of the week and may also only display the movies that have certain user specific categories, attributes and sub-attributes that are specifically relevant to the user, as may be defined in the user's life state. An option may be provided to enable the users to select using the automatic setting of life view parameters. For example, a new user may select this option to speed up the process of setting up the user's life view. The user may then update the life positioning state values as necessary. The life view may be configured to provide interview tools, wizards, or applications that gather and map the information about the life view to the relevant positioning states, life view areas, attributes and sub-attributes.

Figure 3B:
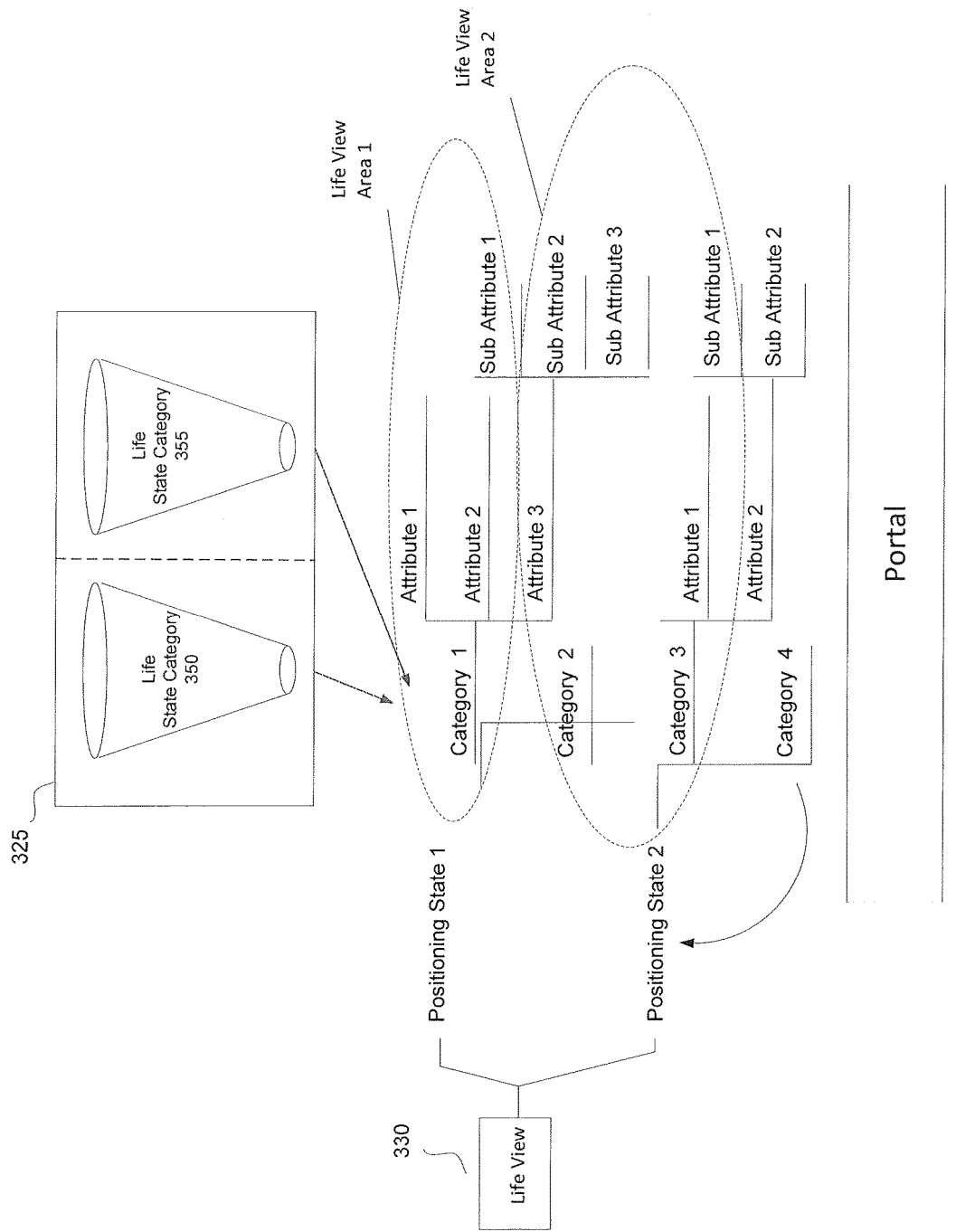
FIG. 3B illustrates an example of a collection life states, in accordance with some embodiments.

FIG. 3B illustrates an example of a life view 330, in accordance with some embodiments. The life views 330 and lifestates 325 may represent the life views and states of many users. The life view information is derived from the life state information. In the current example, the collection of life view 330 includes life states 325, which includes the life states 350 and 355. The funnel shape associated with each of the life states 350 and 355 illustrates the concept of using a life state to funnel or filter the information into the life view 330. The life state helps funneling the information available from the third parties so that only filtered information is pushed by the third parties. In other words, the life state enables the third parties to push the right type of information to the user. The positioning states determine how information is displayed in each life view area. Positioning states may be defined, use information in a category, attribute, or sub-attribute from the life state 325, or be a combination of positioning state definition and life state 325 information. For example, a user may define a positioning state to display the current movies playing in their area, and the list of movies may be ordered by movies that the user would enjoy seeing the most according to the life state 325 information.

The life view may also be used in other portals or compilations of a user's information. In the case of other portal web sites, the life view enables other web sites to display customized information views that may include information and life view settings matching what the user is interested in. In the case of search using a search engine, the life view may enhance the search results generated by the search engine.

Figure 3C:
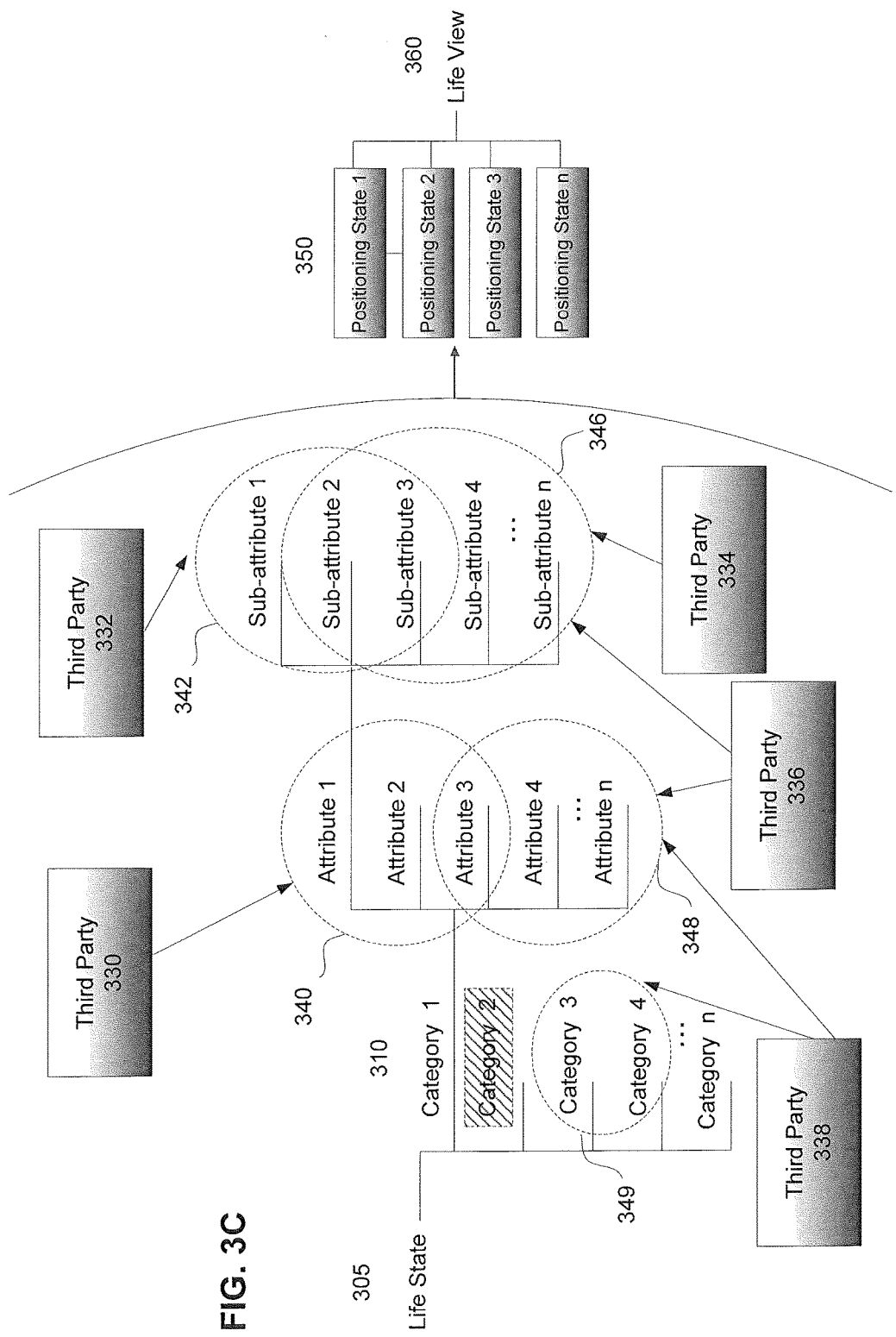
FIG. 3C illustrates an example of granting access to the life view, in accordance with some embodiments.

FIG. 3C illustrates an example of third party information being delivered to the user's life view with some embodiments. A user has complete control how the access to the user's life state is granted. The granting of the access can be at the category level, the attribute level, the sub-attribute level, or combinations thereof. A third party can be granted permission to access various areas of the user's life state. The third party uses and delivers information to the user according to the life state security and gate keeping attributes.

As illustrated, the life state is populated with information delivered by third parties 330, 332, 334, 336, and 338. The arrows from the third parties to the user's categories 310, attributes 348, and sub-attributes 342 indicate information delivered to the user, according to the user's security and gatekeeping attributes defined in the life state. The positioning states 350 may determine third party or other filters, grouping, display characteristics, frequencies, and other parameters for the user's life view 360. The life view may display information from multiple third parties, as defined by the positioning states. The positioning states may include dynamic information delivered from the third parties. Positioning states may also include information regarding the delivered information quality and alignment. For example, a user may select to display new product introductions relating to laptops for that week, and the third party that delivers the information to the user with the highest alignment and quality from the user's life state may be selected in the positioning state as the highest priority to display information in a given life view area.

Figure 3D:
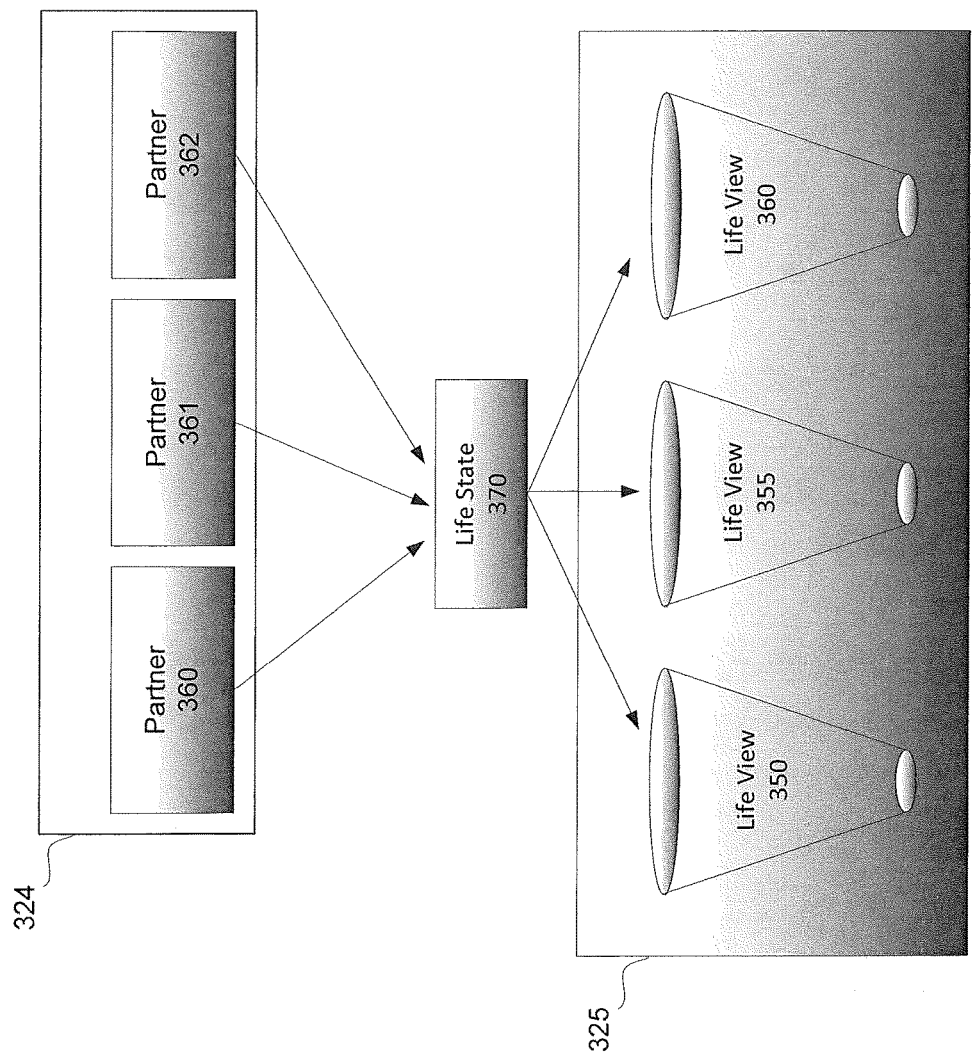
FIG. 3D illustrates an example diagram of a group of partners, in accordance with some embodiments.

FIG. 3D illustrates an example diagram of a group of partners, in accordance with some embodiments. The diagram includes life views similar to the life views described with FIG. 3B. For some embodiments, a third party may have to be approved before it can be granted permission to one or more access groups, where a life view may display information from those access groups. A set of criteria may be used to evaluate and approve a third party. The set of criteria may be determined by a management team or an administrator associated with the information delivery system, which in turn supplies the life view with information. For example, the criteria may include one or more of the following: the ability of the third party to provide information to the users according to their life states, the type of service, merchandise and/or information that the third party is offering and whether they map to the categories, attributes and sub-attributes defined by the life state structure, the ability of the third party to map its services and information to the life state structure, the reputation of the third party, the likelihood that the third party will continue to perform as a partner and a leader in the category/attribute/sub-attribute that it is assigned to, etc. Other criteria may also be used.

This criteria determines the extent, quality, and type of information that is supplied to the life view, through the life state.

Once a third party is approved, it becomes a partner. A license may be granted to the third party. The license may give the third party permission to copy the users' life states for a defined period. There may be an expiration date, and the license may need to be renewed. The third parties use the copies of the life states to filter its information, which may be displayed through the life view, or the third parties may customize its web site for the users when the users visit the websites of the third parties. Depending on the actions of a third party, a license may be active, suspended, or revoked. Other license status may also be used. Security credentials including user identification (ID) and password may be assigned to an approved third party. A third party who has been approved is referred to herein as a partner. For some embodiments, only those partners whose status is active may be granted permission to access the users' life states. There may be different types of partner. For example, a partner may be an individual, an organization, a governmental agency, etc. The partners may also be defined based on the type of services they offer. For example, the type "Search Engines" may be used for Microsoft and Google when they become partners, and the partner type "Government" may be used when the Medicare office may want to access the users' life states for benefits administration. The information delivered by these partners, through the user's life state, is displayed in the user's life view with the embodiments described herein.

In the current example, the block 324 represents all of the partners. They include the partners 360, 361 and 362. These partners have been granted permission to the life state 370. The life state may feed into one or multiple life views as defined by the user and embodiments herein. As described with FIG. 3C, the level of permission of each of the partners 360, 361 and 362 may be different. The directions of the arrows from the partners 360, 361 and 362 to the life state 370 illustrate the filtering of the information from the partners. For some embodiments, the partners may push information to the users, which may be displayed in the user's life view, and they may also offer auto-load program that automatically populates user attributes in the life state, which may be displayed in the user's life view. For example, Amazon.com may push information to a user (such as new technology product releases), and Amazon.com may also offer an auto-load program that populates attributes relating to technology adoption, asset inventory, etc. In either case, this information pushed by Amazon may be displayed in the user's life view, defined by the user and the embodiments herein.

Figure 3E:
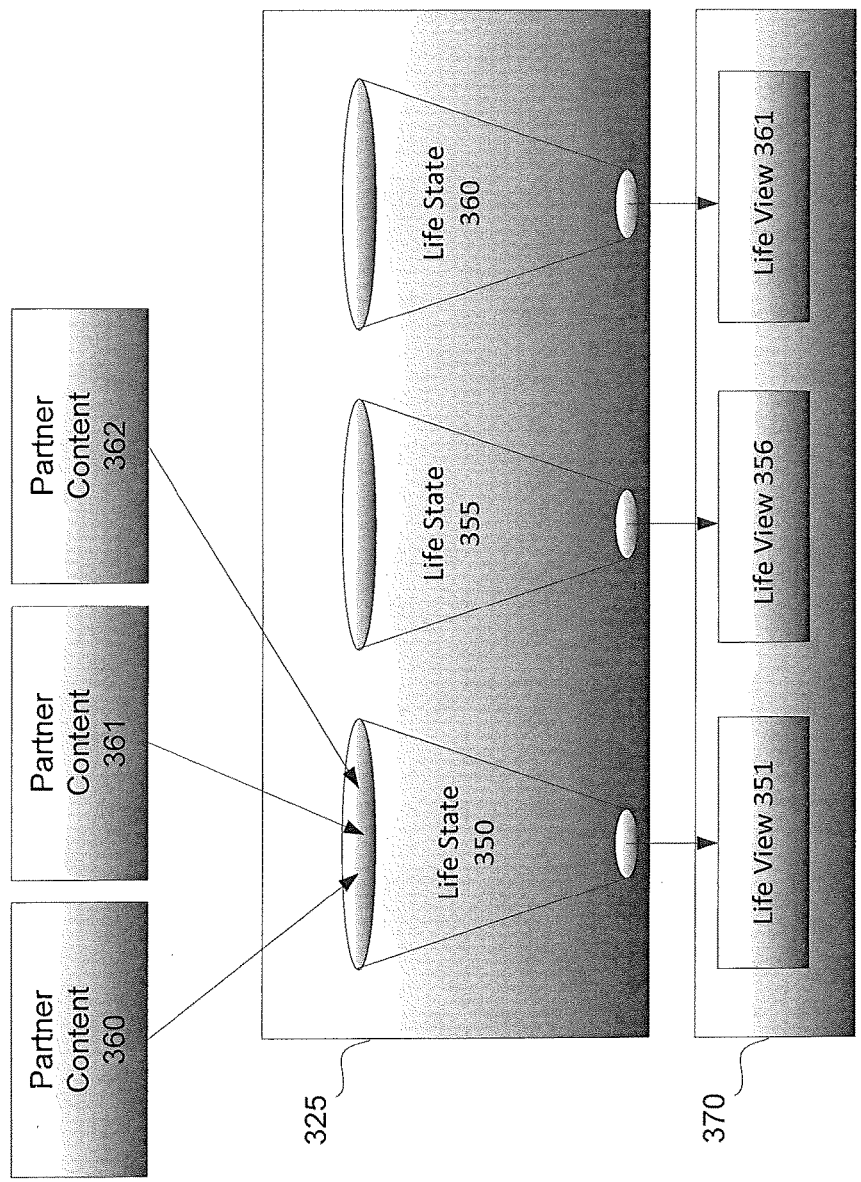
FIG. 3E illustrates an example diagram of the life view, in accordance with some embodiments.
Figure 3F:
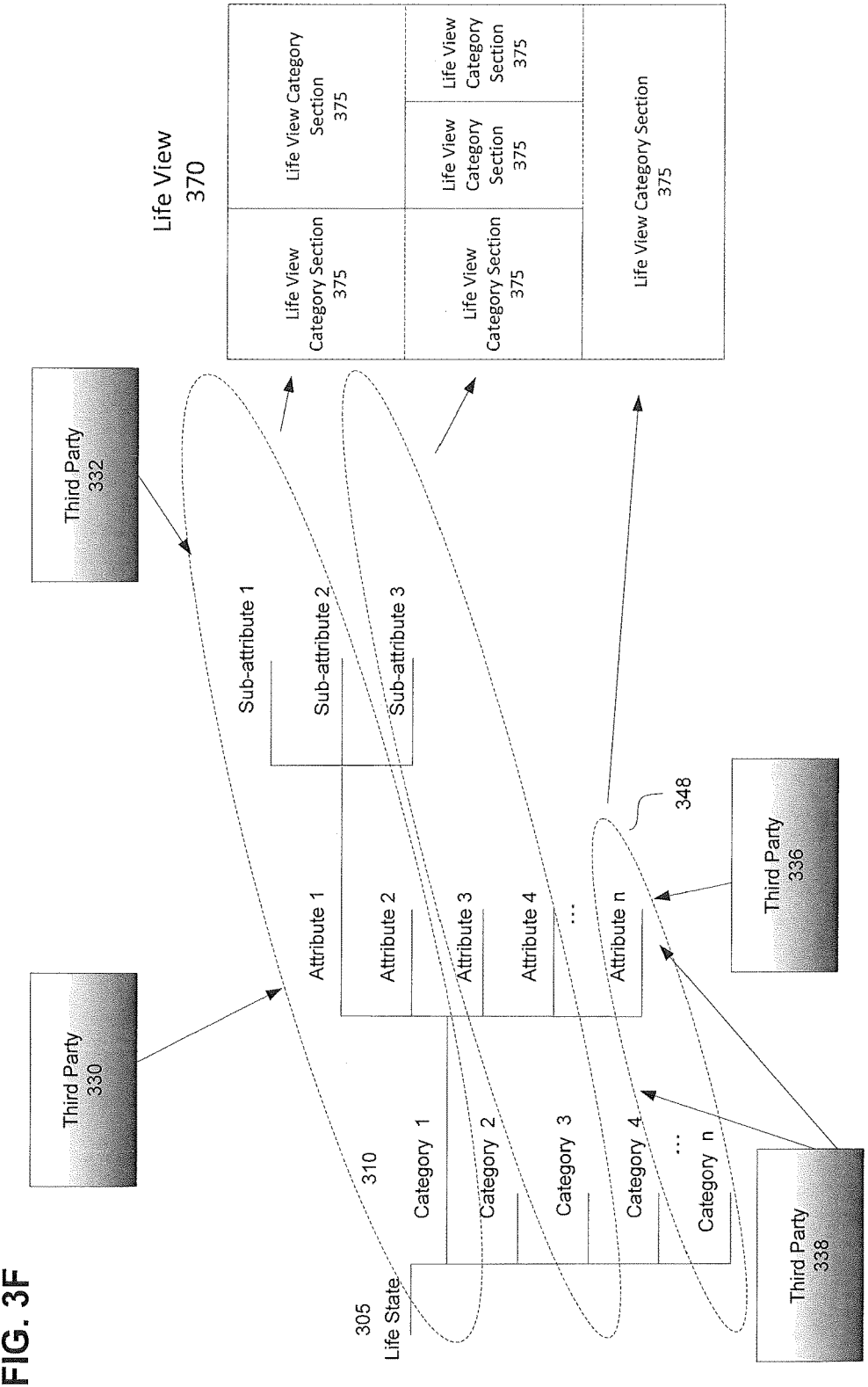
FIG. 3F illustrates an example diagram of Life State Categories, Attributes, and the life view, in accordance with some embodiments.

FIG. 3E illustrates an example diagram of a life view, in accordance with some embodiments. The information delivery server may be configured to receive the filtered information from the partners 324 on behalf of the users and present that information to the user via their life views 370. Each user is associated with a life view. In the current example, the life view 351 is associated with the life state 350, the life view 356 is associated with the life state 355, and the life view 361 is associated with the life state 360. To access the filtered information, the users may need to log in to the information delivery server using their user IDs and passwords. The filtered information may also be stored as floating variable, cache, memory, etc. on any device or system that accesses the filtered information. The directions of the arrows from the life states 350, 355 and 360 to the respective life views 351, 356 and 361 illustrate the flow of the filtered information to the life views. The information available via the life view 351 may be different from the information available via the life view 356 because the life state 350 may be different from the life state 355. FIG. 3E also illustrates the overall concepts of embodiments of the present invention where the collection of life states 325 is used to filter the information from the partners 324 to create the filtered information (or a subset of the information of the partner), where the filtered information is presented to the users via the life views 370. For some embodiments, the pulling of the filtered information from the partners is automatic. Some embodiments may include partners' portals pulling the filtered information.

Server Applications

Figure 4:
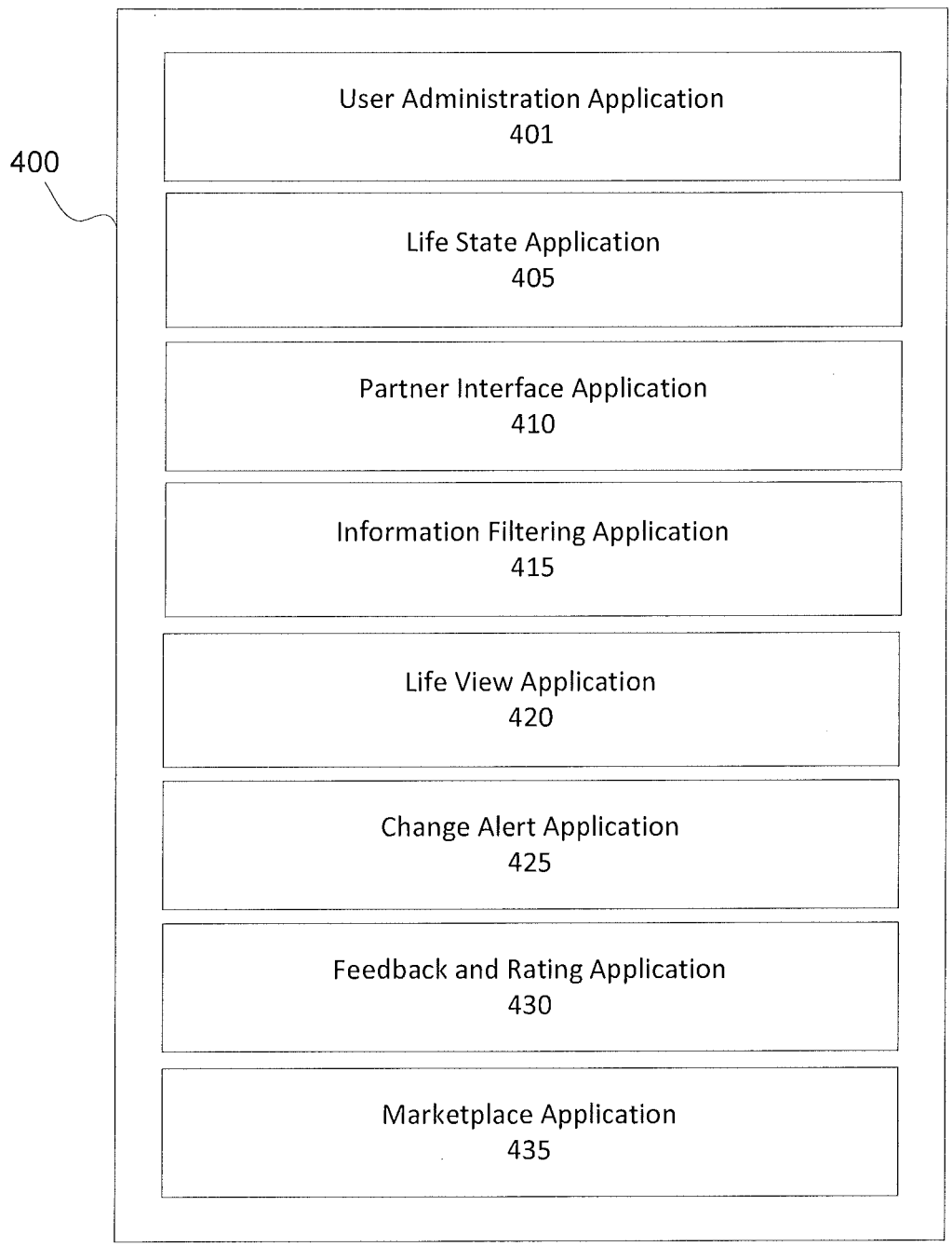
FIG. 4 illustrates example applications that may be used to enable the users to receive the filtered information from the partners, in accordance with some embodiments.

FIG. 4 illustrates example applications that may be used to enable the users to receive the filtered information from the partners, in accordance with some embodiments. The information delivery server 400 may include user administration application 401, life state application 405, partner interface application 410, information filtering application 415, life view application 420, change alert application 425, rating application 430 and marketplace application 435. It may be noted that even though these applications are described herein as separate applications, the functionalities of two or more of them may be combined into one application. These applications may be used to pull filtered information from various resources. The resources may include Internet websites associated with the partners. Non-Internet resources may also be used. For example, a user's life state may be replicated on devices, appliances, or any means that allows the user to control how to grant permission to the user's life state, the third parties to access the user's life state, and the pushing of the filtered information by the third parties on behalf of the user. It may be noted that not every device or appliance used in embodiments of the invention is a filtered information pushing mechanism. That is, some devices may be registered in the core system to receive the pushed information, and then the devices may only functions in the ecosystem as a conduit for the pushing of the filtered information to the users.

The life states of all of the users may be securely stored in the database associated with the information delivery server 400 and in a relational structure with tables and fields arranged in ways that are logical and meaningful to the user. When the users update their life states, the updated values may be stored in the same database. It is possible that the updates may also be propagated to the Life View and other replicated systems, devices, appliances that locally store the values, as well as third parties that customize their web sites according to these values. This propagation would be similar to a change trigger.

For some embodiments, a copy of the user's life view may be downloaded and stored in the memory of the client computing system associated with the user. The copy in the client computing system is referred to as a local copy of the life view. It is possible that, in some embodiments, only a portion of the information or only related information may be stored in the client computing system. This is because getting the exact copy may be too big.

Sometimes it might be just the user id that's stored in floating variables, memory, cache, etc., which then pulls the user's life state when needed.

The partner interface application 410 may be configured to enable the information delivery server 400 to communicate with one or more servers of the partners. For example, this may enable the partners to access the users' life states as defined by the users' gate keeping and security features.

This may include interfacing with the partners to enable the users' life views, customized websites, filtered search results, etc.

The information filtering application 415 may be configured to share the life states of a user with the partners, limited to the level of permission granted by the user. The information filtering application 415 may also be configured to apply the security and the gate keeping features set by the user. As described, the partners may use the user's life state to filter their information. The information filtering application 415 may receive the filtered information from the partners and present the filtered information to the user via the user's life view. As will be described, the partners may procure the life states via a marketplace.

The life view application 420 may be configured to allow the users to define how the information provided to the users may be presented and viewed, according to the embodiments herein. The life view application 420 may be configured to provide a layout interface to allow the user to design the look and feel of the user's life view according to user defined settings and dynamic settings that change according to the user's life state. The layout interface may include parameters to control the fields, links and dimensions of the layout. The user may define multiple layouts that change according to event rules defined by the user and the user's life state. For example, the user may define parameters that cause the layout to emphasize on financial and economic information when there is a significant swing in the financial market. The layout interface may allow the user to define different information regions that change according to user defined settings and the user's life state. Each of the information regions may focus on the information that corresponds to one or more aspects of the user's life. As mentioned, each of the users may be associated with a life view. The user accesses the life view by logging into the information delivery system using the assigned user ID and password. The life views, their configurations, layouts, and information regions may be stored in the database associated with the information delivery server 400.

The change alert application 425 may be configured to notify the partners and the users whenever there is a change that may affect the process of proving the filtered information to the users, and the changes may be reflected in the user's life view. The changes may originate from the partners and/or users. For example, the change may be necessary to address complaints or suggestions from many users and/or partners, and the changes may block or alter the information provided by that partner in the user's life view. The changes may originate internally by a management team associated with the information delivery system to enhance the information filtering services for the partners and/or the users, and the enhancements may be reflected in the user's life view. For example, it may be necessary to add a new category, to migrate an attribute from one category to another category, to delete an attribute, to change the meaning of an attribute, etc., and the changes may be reflected in the user's life view. The changes may originate externally by others. The change alert application 425 may also be configured to notify a partner when the user modifies the user's life state, and the changes may be reflected in the user's life view. Similarly, the change alert application 425 may notify a user when the partner's ability to provide its information is modified.

The rating application 430 is configured to improve the quality of the filtered information. This includes providing a mechanism to allow the users to rate the partners as well as a mechanism to allow the partners to rate the users. The rating of the partners is based on whether the filtered information pulled from the partners is aligned with the life states of the users. The rating may be based on a collection of feedbacks from many users. This helps the partners to fine tune their filtering mechanism if they receive low ratings. This also helps identifying the partners who consistently fail to comply with the filtering requirements. The user's life view may also allow users to rate partners and delete or hide partner delivered information from the user's life view, according to the partner's information quality. For example, a partner who provides unsolicited advertising information should get a low rating and the user may delete or hide the partner's information from the life view, because it abuses the information delivery system. A consequence for a partner who gets a low rating is a suspension or revocation of its license, and the user's life view may delete or hide the partner's information by the user's direct modification to the life view or by the user's designation of the low rating in the user's life state. Following are some conceptual examples of the ratings for a partner, and these ratings may be viewed, modified, or accessed in the user's life view or the user's life state:

None—The information from the partner is not aligned with the user's life state

Low—The information from the partner is minimally aligned with the user's life state Moderate—The information from the partner is mostly aligned with the user's life state High—The information from the partner is significantly aligned with the user's life state In order for a user to receive accurate filtered information, it may be necessary for the user to keep the user's life state updated or utilize automatic loader programs that accomplish the same. This is because the user is rated based on whether the user's life state is aligned with the user's behavior whenever applicable. If a partner determines that the user's life state is not accurate, the partner may notify the user of the alignment issue, through a system of ratings. This notification may be visible in the user's life view. If the user's behavior remains non-aligned with the user's life state for an extended period of time, the information provided to the user may be limited or less accurate. Following are some conceptual examples of the ratings for a user, and these ratings may be viewed, modified, or accessed in the user's life view or the user's life state:

None—The user's transactions are not aligned with the user's life state

Low—The user's transactions are minimally aligned with the user's life state

Moderate—The user's transactions are mostly aligned with the user's life state

High—The user's transactions are significantly aligned with the user's life state The marketplace application 435 may be configured to implement an exchange or a market where the users and the partners participate in sell and buy transactions. In some embodiments, the marketplace may be implemented as a secure web portal that enables the partners to procure the users' life state according to the security, gatekeeping, and marketplace features. For some embodiments, the marketplace application 435 may be implemented as an auction portal with bidding and purchasing options. Other purchasing options (e.g., fixed price, etc.) may also be used. The auction portal may allow searchable bids and reverse bids by the partners and the users. Bid information may be stored in the secured database associated with the information delivery server. The user's marketplace transactions and activity may be displayed in the user's life view.

Security and Gatekeeping Features

A partner may access the life states of the user according to the user's security and gatekeeping features. Referring to FIG. 3D, a user may use the security feature 370 and the gatekeeping feature 371 to control how the information is filtered so that the user's life view will receive the most relevant and most desirable information. The user may use the security feature 370 to control the visibility at the global level, partner level, category level, attribute level or sub-attribute level. The security features set at the global level apply to all categories, attributes, and sub-attributes. The security features set at the category level apply to all corresponding attributes and sub-attributes. The security features set at the attribute level apply to all corresponding sub-attributes and so on. When there is a difference among the settings of the security features, the settings of the security features at the lower level takes precedence over the settings of the security features at the corresponding higher level. For example, if a user sets a value at the global level, and then sets another value at the category level, the value at the category level will determine the setting of the security features. Following are some examples settings of the security features:

Not available—No information relating to the category, attribute, or sub-attribute is available to any partner or any other parties to deliver information to the user's life view Available only to preferred/approved list—No information relating to the category, attribute, or sub-attribute is available to any partner or other parties unless they are included in the user's list of approved or preferred partners and/or parties to deliver information to the user's life view Available—Information relating to the category, attribute, or sub-attribute is available to any partner to deliver information to the user's life view Available to content providers—No information relating to the category, attribute, or sub-attribute is available to any partner to deliver information to the user's life view unless the partner is a content provider or the partner is in the list of approved or preferred content providers Available to advertisers—No information relating to the category, attribute, or sub-attribute is available to any partner to deliver information to the user's life view unless the partner or other party is an advertiser or is in the user's list of approved or preferred advertisers The gatekeeping feature 371 illustrates an option that a user may use to control how much information the user is willing to receive from which partners into the user's life view. The user may use the gatekeeping feature 371 to control how an attribute can be used to filter information from a partner and the volume of the information delivered to the user's life view. The gatekeeping features set at the global level apply to all categories, attributes, and sub-attributes. The gatekeeping features set at the category level apply to all corresponding attributes and sub-attributes. The gatekeeping features set at the attribute level apply to all corresponding sub-attributes and so on. When there is a difference among the settings of the gatekeeping features, the gatekeeping features set at the lower level takes precedence over the gatekeeping features set at the corresponding higher level. For example, if a user sets a gatekeeping value at the global level, and then set another conflicting gatekeeping value at the category level, the gatekeeping value at the category level will prevail. Some examples of the gatekeeping features settings include:

No gatekeeping—All of the information is passed to the user's life state and then to the user's life view through the funnel Approved list—The information is passed to the user's life state and then to the user's life view if the information is from a partner that is in the list of the user's approved or preferred partner Content providers—The information is passed to the user's life state and then to the user's life view if the information is from a partner who is a content provider or if the partner is in the user's list of approved or preferred content providers Advertisers—The information is passed to the user's life state and then to the user's life view if the information is from an advertiser or if the information is from a partner who is in the user's list of approved or preferred advertisers.

None—No information is passed to the user's life state and then to the user's life view For some embodiments, there may also be many other gatekeeping controls, such as frequency and precedence controls that will affect how the system queues up information from partners for the user's life view—which will be a key control in promoting partners to only push the information that really counts, while the user receives only the information that really counts.

In general, gatekeeping features are different from security in that they determine how information is delivered and displayed to the user's life view. This includes controlling the frequency, extent, type, and volume of filtered information that is pushed by the partner. This is where the marketplace implementation becomes important. When a user wants to allow information for a specific attribute to be sold in the marketplace, but no information is delivered for that attribute, then the security settings would allow visibility in the marketplace, and the gatekeeping settings would not allow information delivery to the portal (or when surfing to external sites).

Automatic Populating and Updating Attribute Values

For some embodiments, the life state application 405 described with FIG. 4 may be configured to auto-populate the attributes and sub-attributes with values. The values may be derived from the partners. It is possible that the partners may accumulate extensive information about a user's behavior, which in turn gives them the ability to populate the users attribute values according to this behavior. For example, a set of attributes for a user's asset inventory may include various products, etc. Amazon.com could easily populate the asset inventory according to the user's purchase history. A user's behavior may also be accumulated by the user's life view, by tracking which links or other interactions a user makes within their life view. There may be an option to allow the user to select the auto-populating feature.

For some embodiments, the life state application 405 described with FIG. 4 may be configured to automatically update the life state of a user. There may be a setting that enables the user to indicate that the automatic update of the user's life state is allowed. The updates may be based on transactions that the user engages in or behavior the user engages in while using their life view, and may be performed periodically. It is possible that user's behavior may not be consistent with the user's life state. For example, the user indicates in the life state category and attribute values that would lead to avoidance of water sports related transaction behavior. However, through the user's life view, the user frequently views websites that relate to water sports. In this scenario, the life state application 405 may modify the user's life state to align with the user's behavior. This may include automatically translating a user's life view behavior and interaction into values for the attributes and/or sub-attributes. The user can also review, assess, and override any values that are set from an auto update, if the manual setting of the values better reflects the user's life state. This ensures that the user's life state is up to date, as realized through the user's behavior in the life view.

For some embodiments, the functionality of auto-updating and auto-loading can initially set to baselines, but it can also update attribute values at the users' discretion. There might be options or parameters on the auto-update program such as "Do not update values that have been manually updated." This would mean only null values or those previously set by the auto-update program would be updated.

Network with Partner Servers

Figure 5:
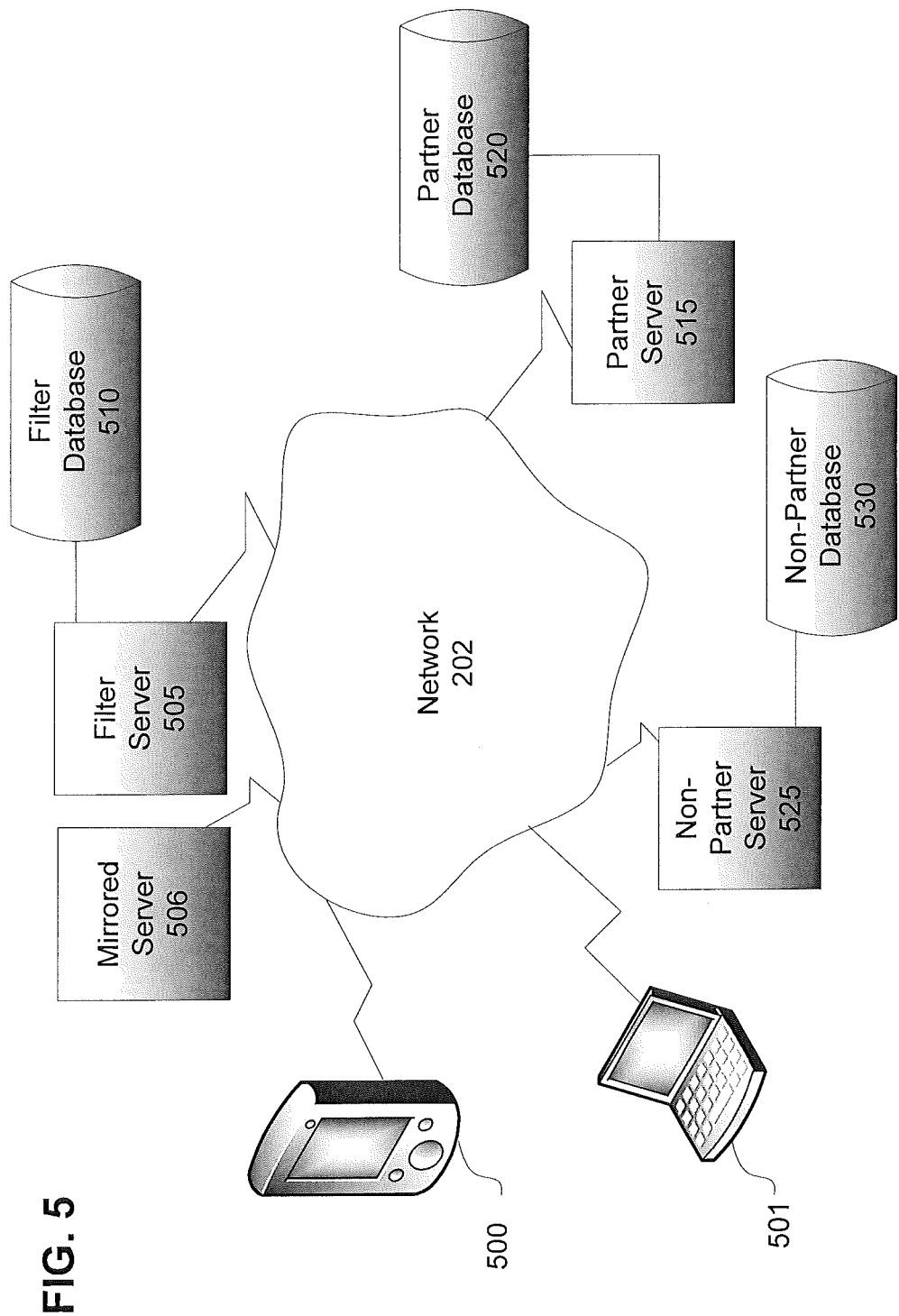
FIG. 5 illustrates an example of a network with an information delivery server, in accordance with some embodiments.

FIG. 5 illustrates an example of a network with an information delivery server, in accordance with some embodiments. The network may include an information delivery server 505 coupled with database 510 and connected to network 202. Also connected to the network 202 are client computing systems 500 and 501, partner servers 515 and 525 and their respective databases 520 and 530. The client computing systems 500, 501 may be configured with browser software to access the services of the information delivery server 505 using the Internet. The client computing systems 500, 501 may be connected to the network 202 via wired or wireless communication (e.g., RF, Bluetooth, etc.). For example, a user may use the client computing system 500 to register with the information delivery server 505, input values to configure the user's life state, and set up security features and gatekeeping features, which in turn provide information to the user's life view. The user may use the client computing system 500 to log in to the information delivery server 505 and access the user's life view to view the filtered information. The user's life state, life view, security features, gatekeeping features, and filtered information may be stored in the database 510. The network infrastructure described in FIG. 5 may also be used to enable accessing partner websites, partner content, performing web searches from within the life view using partner search engines, and enabling the partners to participate in the marketplace to procure the life state information.

Embodiments of the invention may also include mobile-enabled implementations to enable the users to user the mobile devices to communicate with the information delivery server. As illustrated in FIG. 5, the mobile device 500 may be used by a user to connect to the information delivery server 505 via the network 202. Having the mobile capability may enable the users to provide updates on an impulse basis, especially at a time when the user is experiencing something that may need to be reflected in the user's life state. The information delivery server 505 may enable the user to download a mobile application for this purpose. The mobile application may include user interface that makes it easier to provide information about the user's experience. For example, the user may be watching a movie, and the user may use the mobile device to indicate the name of the movie and how much the user enjoys watching that movie. That action will be analyzed by the information delivery server and the user's entertainment attribute may be updated. These embodiments may be immediately available and reflected in the user's life view.

Mirroring and Distributed Processing

Referring to FIG. 5, in some embodiments, there may be one or more mirrored servers 506 configured to perform tasks similar to the information delivery servers 505 to accommodate the demand and usage by many users. These mirrored servers may be located at different geographical areas. For example, at a first site, there may be one or more mirrored servers 506. Each of the mirrored servers 506 may be associated with a mirrored database 511 which may be configured to store information similar to the database 510. Further, there may be multiple mirrored sites, each having similar hardware and software configuration and set up as the first site. The multiple sites may collaborate with one another in a distributed manner to help speed up the process enabling the users to set up and maintain their life states, interacting with the partner servers, receiving the filtered information from the partners, enabling the users to configure their life views, presenting the filtered information to the users' life views, etc. Using mirrored servers and distributed processing may help the users to view most relevant and accurate filtered information in their life views in near real time.

It should be noted that there are many different distributed processing architectures and the description provided here is not meant to limit to a particular architecture, but rather to convey that distributed processing may be implemented to provide better user experience for some embodiments.

Flow Diagrams

FIGS. 6-11 describe various processes that may be performed by the information delivery system and life view. Each process includes multiple blocks, with each block representing one or more operations. The sequences of the blocks may vary depending on the implementations. Some operations may be combined while some operations may be separated into multiple operations.

Figure 6:
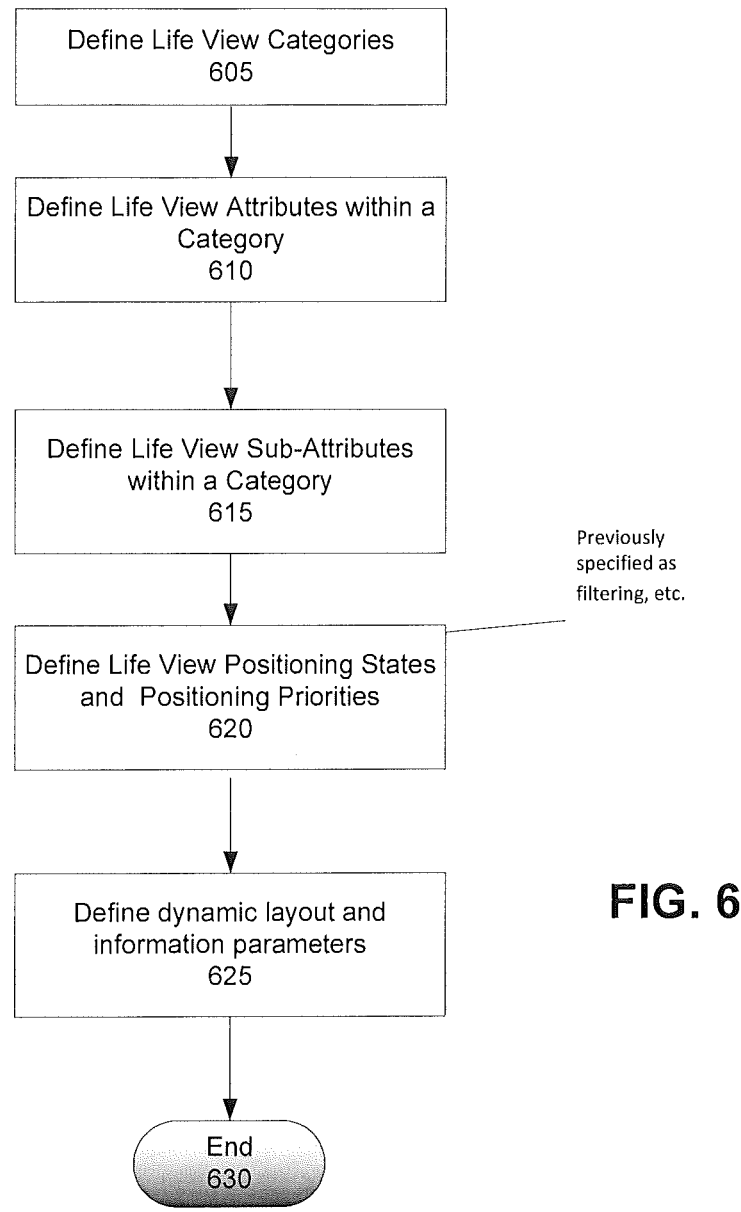
FIG. 6 illustrates an example flow diagram of a process that may be performed by an information delivery system life view to display the life states, in accordance with some embodiments.

FIG. 6 illustrates an example flow diagram of a process that may be performed by an information delivery system to set up the life views, in accordance with some embodiments. The process is associated with operations that may be performed by the information delivery server 505 described with FIG. 5. At block 605, the structure of a life view is defined. This may include defining the categories, the attributes, the sub-attributes, the sub-attributes, the life positioning states, the life positioning priorities, and any deeper level of life positioning states and positioning priorities. For example, each of the attributes, sub-attributes, life positioning states, and life positioning priorities may be represented by fields in a database table with each of the fields having a value or as programming variables in RAM or cache, or as other embodiments. Each time a new user is registered with the information delivery server 505, a life view may be associated with that user, as shown in block 610. The attributes, sub-attributes, life positioning states, life positioning priorities, and dynamic layout and parameters associated with the user's life view may be automatically given some values. These values may be derived from the offerings of the partners, as shown in block 615. At block 620, the user is allowed to update values that determine how and if these attributes and/or sub-attributes are displayed. This may be due to changes to the user's life and how the user's life positioning state, life positioning priorities, and user's life state is defined. At block 625, options may be made available to enable the users to set security features and gatekeeping features, and other layout and information parameters to customize the user's life view. As described, these features allow the users to configure the visibility of the user's life view and how or from whom the information is to be pulled on behalf of the user.

Figure 7:
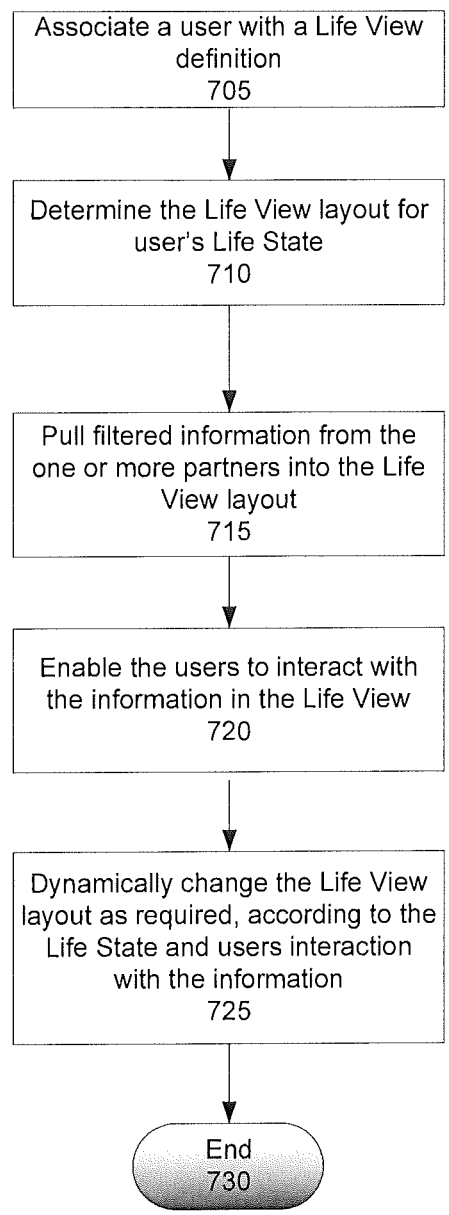
FIG. 7 illustrates an example flow diagram of a process that may be performed by an information delivery system life view to allow the users to access the filtered information, in accordance with some embodiments.

FIG. 7 illustrates an example flow diagram of a process that may be performed by an information delivery system to allow the users to view the filtered information, in accordance with some embodiments. The process is associated with operations that may be performed by the information delivery server 505 described with FIG. 5. When a user registers with the information delivery system and create a user account, that user account is associated with a user's life view, as shown in block 705. The user may be provided options to configure the user's life view. This may include configuring the layout for the user's life view. At block 710, one or more partners may access the user's life state. The access of the user's life state is based on permissions granted by the users. The partners may use the user's life state to generate filtered information that is aligned with the user's life state. At block 715, the filtered information is pushed by the partners. At block 720, the filtered information is presented to the user via the user's life view, according to the user's life positioning states and life positioning priorities.

Figure 8:
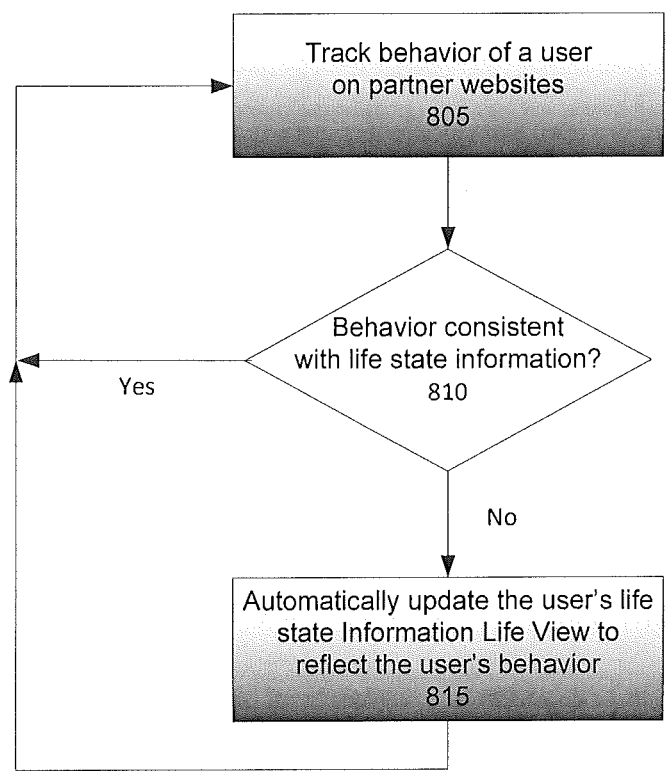
FIG. 8 illustrates an example flow diagram of a process that may be performed on an information delivery server to enable automatically updating the user's life view, in accordance with some embodiments.

FIG. 8 illustrates an example flow diagram of a process that may be performed on an information delivery server to enable automatically updating the user's life state, in accordance with some embodiments. The process is associated with operations that may be performed by the information delivery server 505 described with FIG. 5. The process may include tracking the user's behavior when the user visits a website of the partner. As described above, when the user visits the website of a partner, the partner may recognize that the user is a member of the same information delivery system that the partner is associated with. The partner may customize the content of its website, filter the search results using this information, or customize the content of the user's life view, according to the embodiments herein. The account of the user and the account of the partner with the information delivery system may be related or connected. The recognition may be based on the information stored locally on the client computing system of the user. Alternatively, the user id may be locally stored or stored in temporary internet/buffer files by associating with another user login, and then the attribute values from the user's life state may be obtained, refreshed, or updated.

The tracking operation may include interacting with the partner's server and receiving the tracking information from the partner's server, as shown in block 805. At block 810, a test is performed to determine if the user's behavior is aligned with the user's life state. If the user's behavior is aligned, the process flow from block 810 back to block 805 and the determination may continue. However, from the block 810, if the user's behavior is not aligned, the process flow to block 815, where the user's life state may be automatically updated to reflect the user's behavior. From the block 815, the process may flow back to block 805 and the determination may continue. For some embodiments, this process may be performed periodically. An automatic update option may be selected by the user. In this process, the users will also be provided with the attribute values that are not aligned, which may help the user and partner migrate towards better alignment. The user's life view will be updated according to these changes.

Figure 9:
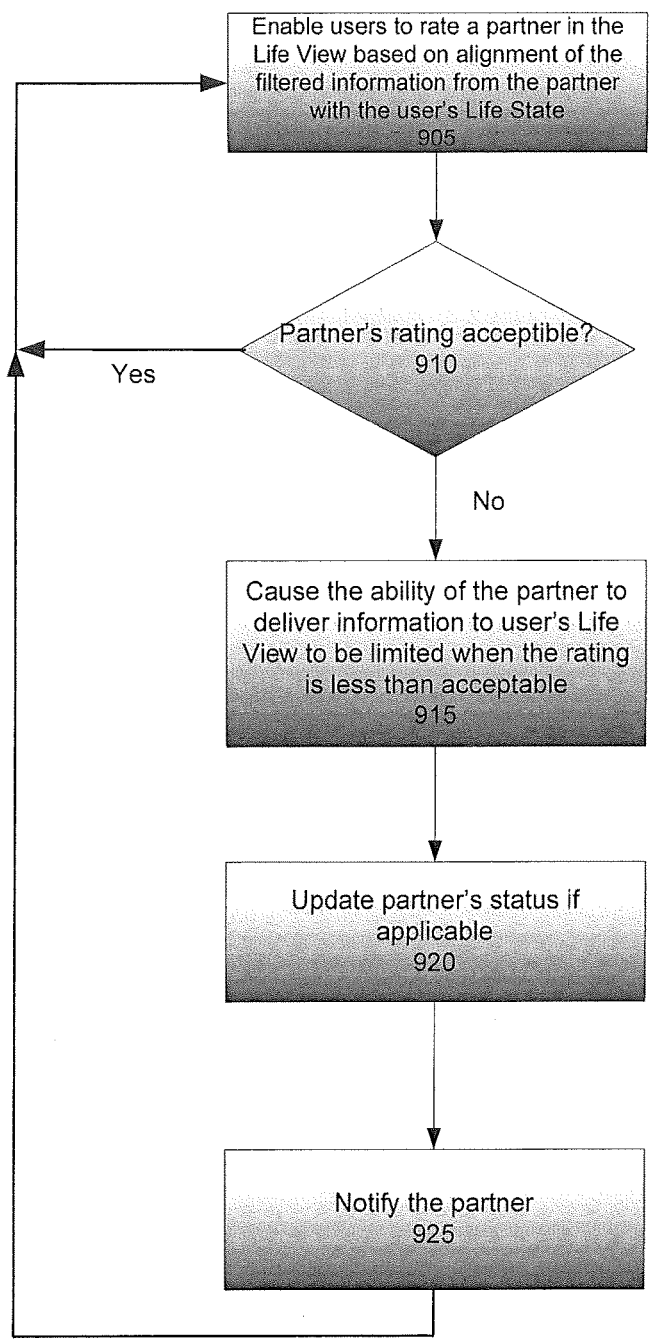
FIG. 9 illustrates an example flow diagram of a process used to rate a partner through the life view, in accordance with some embodiments.

FIG. 9 illustrates an example flow diagram of a process used to rate a partner, in accordance with some embodiments. At block 905, the users are enabled to provide rating information for a partner. The rating is based on how the filtered information from the partners is aligned with the users' life states. If the alignment is not as expected, the rating may be low. A rating scale may be set by the management team associated with the information delivery system. At block 910, a test is performed to determine if the rating is acceptable. If the rating is acceptable, the process may flow back to block 905 to collect more ratings. It may be noted that the rating of the partner may be evaluated after collecting a large collection of rating from many users. From the block 910, if it is determined that the rating is not acceptable, the process may flow to block 915 where the information from the partner may be limited. For example, the information pushed by the partner may include unsolicited and/or unwanted advertising information, and the information delivery system may partially or completely block the information from the partner. For some embodiments, if the partner's rating is low, then the user may or may not want to limit the information from that partner. In other words, a low alignment rating for the partner may not necessarily mean the user shows less interest in the information pushed by the partner. If the user wants to further limit, reduce, or prohibit information from a given partner, the user can use the security and gatekeeping settings to do that. At block 920, the information delivery system may change the status of the partner if necessary. For example, the partner may be placed suspended and its status may be changed from "active" to "suspended." This type of disciplinary action may be performed in aggregate. It may be performed by an administrator or someone with such authority, and not likely a function of automation. Partner ratings and the user's management of a partner's information delivery may also be accessible and reflected in the user's life view.

At block 925, the partner may be notified about the rating and related changes. For example, warnings may be sent to the partner to notify the partner about the change in status. The partner may fine tune its filtering mechanism to improve alignment. The process may flow from the block 925 to the block 905. The partner rating operations may be performed periodically or as needed.

Figure 10:
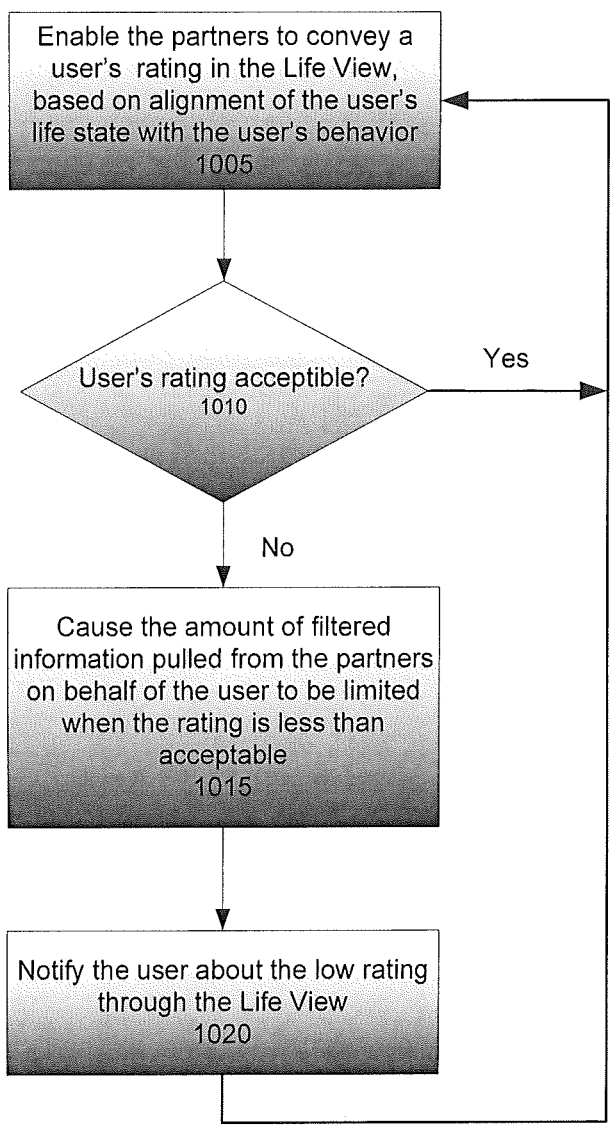
FIG. 10 illustrates an example flow diagram of a process used to rate a user and convey the rating through the user's life view, in accordance with some embodiments.

FIG. 10 illustrates an example flow diagram of a process used to rate a user, in accordance with some embodiments. At block 1005, the partners are enabled to provide rating information for a user. As described above, a user's life state involves many aspects of the user's life, and it is expected to change as the user experiences changes in the user's life. The changes may be reflected in the user's behavior when, for example, the user visits a website of a partner. The partner may track the user's behaviors, compare those behaviors with the user's life state, and give the user a rating. At block 1010, a test is performed to determine if the rating for the user is acceptable. As with the rating for a partner, a rating scale may be determined by the management team, and the scale may be the same or different from the scale used to rate the partner. If the rating is not acceptable, the process may flow to block 1015, where the information delivery system may perform operations to restrict the amount of filtered information that is pushed on behalf of the user. Other operations may also be performed when the rating is not acceptable. For example, warnings may be sent to the user to notify the user of the low rating; requests may be sent to the user to notify the user to update the user's life state; the status of the user may be changed, etc. as shown in block 1020. From the block 1010, if the rating is acceptable, the process may flow back to block 1005 to collect more ratings. It is possible that the rating of the user may be evaluated after collecting a large collection of rating from many partners. From the block 1020, the process may also flow back to the block 1005. The user rating operations may be performed periodically or as needed. Embodiments of the invention may merely notify the users of the low rating but may not cause any impact on the amount of filtered information being pushed to the user. As such the operations described in block 1015 may not be performed. In these situations, the user may use the user ratings confidentially to manually work on improving the user's life state or maybe just understanding it better. User ratings and the partner's management of a user's life state may also be accessible and reflected in the user's life view.

Figure 11:
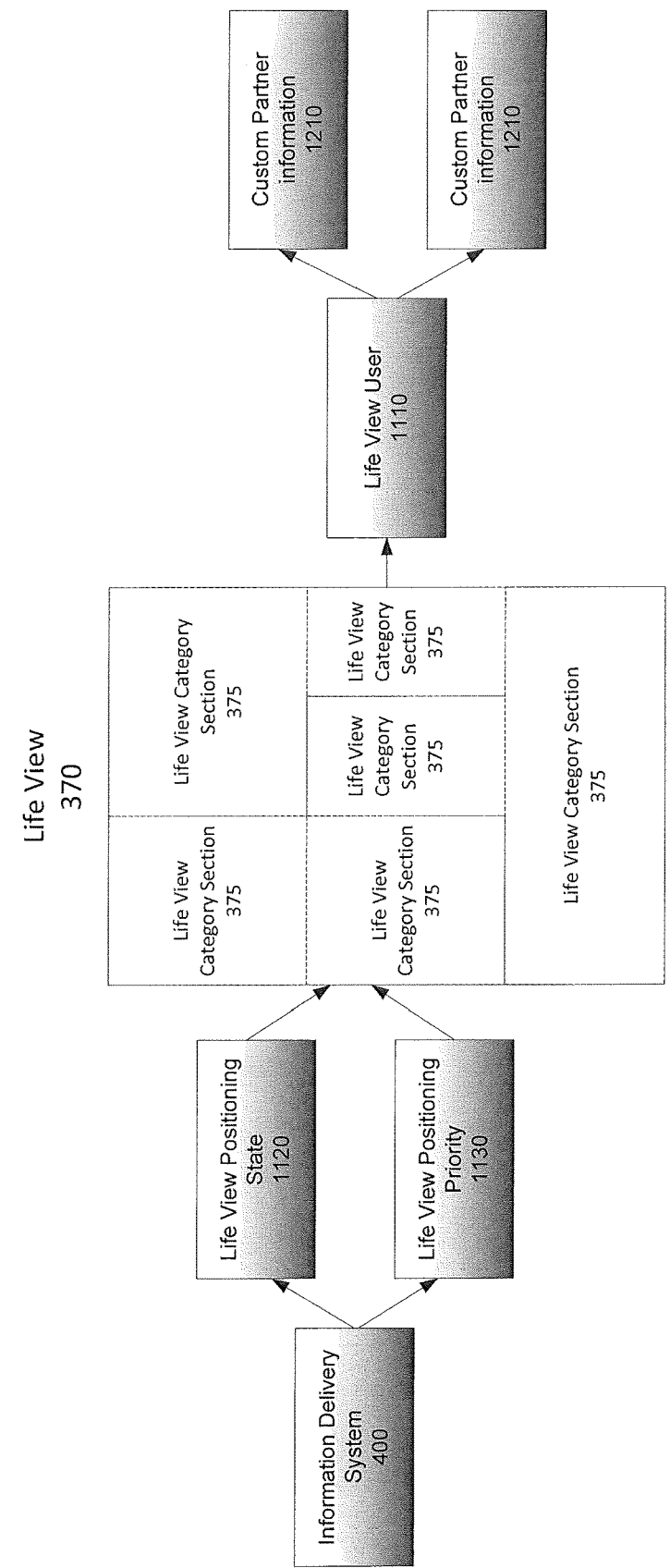
FIG. 11 illustrates an example flow diagram of a process used to show information delivery through the user's life view, in accordance with some embodiments.

FIG. 11 illustrates an example flow diagram of a process that may be used to enable accessing the user's life view, in accordance with some embodiments. It may be noted that the operations described in the different blocks of this process may not necessarily need to be performed in sequence and some may be performed by different partners. The blocks are meant to convey different ways that the user's life view may be used in various situations.

At block 370, the user may use a partner's information on their life view to allow the partner to customize the user's visits to its websites, web pages, or other means of displaying information. This may be useful when the user visits the partner's website. Information not consistent with the user's life state or life view may be filtered from the website and only relevant information may be displayed. The partner may associate the user id of the user with the user's life view or life state from the information delivery system, retrieve (or refresh or update) the user's life view, and customize its web pages or other embodiments accordingly. The partner may provide a toggle to enable the user to activate or deactivate the filtering of the partner's information based on the user's life state or life view. At block 1120, the user may use the life view positioning states to determine how the various regions of the user's life view may be positioned for display for the user. At block 1130, the user may use the life view positioning priority to determine how the various regions of the user's life view may be prioritized for positioning and displayed for the user.

From the descriptions above, embodiments of the inventions may include a method for receiving information about and relevant to a user's life from a user who is a registered member of an information delivery system. The information about and relevant to the user's life includes at least (a) demographic information, (b) ethnic information, (c) social information, and (d) psychological information. The method also includes enabling the user to grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner and displayed in the user's life view. In addition, the method includes receiving the filtered information from the partner, wherein the filtered information is generated by the partner based on applying the information about and relevant to the user's life to information of the partner, wherein the information about and relevant to the user's life is provided by the user using a client computing system associated with the information delivery system, and wherein the information about and relevant to the user's life is received by a server computing system associated with the information delivery system. Embodiments of the invention also include a computer-readable media that includes instructions that perform the operations similar to the method described above.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

What is claimed is:

1. A mirrored and distributed information delivery system, comprising:
  a processing unit;
  a memory and system bus coupled to the processing unit, the memory configured to store instructions comprising:
  receiving, prioritizing, positioning, and displaying information about and relevant to a user's life from a user who is a registered member of the information delivery system, the information delivery system comprising one or more mirrored servers configured to accommodate usage by a plurality of users, wherein the information about and relevant to the user's life includes at least (a) demographic information, (b) ethnic information, (c) social information, and (d) psychological information;
  each of the mirrored servers associated with a mirrored database;
  utilizing a set of criteria to evaluate and approve a partner, wherein the criteria comprises any one of a service type, merchandise type and reputation;
  at least one of the mirrored servers configured to store a user administration application and a life state application, the life state application configured so as to auto-populate attributes and sub-attributes with values derived from one or more partners;
  enabling the user to grant permissions to the partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner, in order for the partner to display customized information relevant to the user's life view, wherein the life view may be altered using a plurality of view positioning states that are configured with dates and activate and inactive states such that a first view positioning state may be used in combination with a second view positioning state, certain view positioning states being assigned a priority; and
  receiving the filtered information from the partner, wherein the filtered information is generated by the partner based on applying the information about and relevant to the user's life to information of the partner, wherein the information about and relevant to the user's life is provided by the user using a client computing system associated with the information delivery system, wherein the information about and relevant to the user's life is received by a server computing system associated with the information delivery system, and wherein the information about the user's life is received, prioritized, positioned, and displayed according to the user's life.

2. The system of claim 1, further comprising:
providing a life view to enable the user to view the filtered information, wherein the filtered information may be a subset of the information of the partner, and wherein the life view associated with the user is independently configurable from a life view associated with another user of the information delivery system.

3. The system of claim 1, further comprising:
providing and displaying information from a marketplace to enable partners to procure the information about the user's life, wherein the user may prioritize, position, and display information regarding marketplace interests, bids, offers, and transactions.

4. The system of claim 1, further comprising:
establishing a data structure to enable the user to provide the information about and relevant to the user's life, the data structure including fields related to one another, wherein each of the fields is associated with a value, and wherein the data structure includes multiple levels such that a field at a lower level is to provide more detail information and value than a corresponding field at a higher level, wherein information may be displayed, prioritized, and positioned in a life view from multiple levels according to the user's life.

5. The system of claim 4, further comprising:
automatically populating the fields of the data structure; and
enabling the user to update the populated fields of the data structure so as to accurately reflect the user's life, wherein baseline information may be displayed, prioritized, and positioned in a life view from multiple levels according to the user's life.

6. The system of claim 5, further comprising:
enabling the user to update the baseline values and the non-baseline values using a mobile computing system and a mobile application associated with the information delivery system, wherein information may be displayed, prioritized, and positioned in a life view on a computing system, mobile application, and by other embodiments herein.

7. The system of claim 1, further comprising:
enabling the user to rate the partner based on whether the filtered information from the partner is aligned with the information about and relevant to the user's life; and
enabling the partner to rate the user based on whether the information about and relevant to the user's life is aligned with behavior of the user when the user visits a website associated with the partner, wherein the user rating for the partner may be used as a setting in the user's prioritization, positioning, and displaying of that partner's information in a life view, wherein the partner rating for the user may be visible in the user's prioritization, positioning, and displaying of that partner's information in a life view.

8. The system of claim 1, further comprising:
storing the information about and relevant to the user's life and life view in a secured relational database associated with the information delivery system; and
enabling the information about and relevant to the user's life to be accessed by the partner when the user visits a website of the partner; and enabling the information about and relevant to the user's life to be customized and accessed by the user through the user's life view.

9. The system of claim 8, wherein customized web pages are presented to the user when the user visits the website of the partner, and wherein the customized web pages are generated by the partner based on the information about and relevant to the user's life, wherein the user may access these customized web pages from a life view.

10. The system of claim 8, wherein filtered search results are presented to the user when the user visits the website of the partner, and wherein the filtered search results are generated by the partner based on search parameters provided by the user and based on the information about and relevant to the user's life, wherein the search parameters and search results generated by the partner may be factored into the information pushed by the partner into a life view.

* * * * *